US012607985B2

(12) United States Patent　　　　(10) Patent No.:　US 12,607,985 B2

Mazur et al.　　　　　　　　　　　　(45) Date of Patent:　　Apr. 21, 2026

(54) SYSTEMS AND METHODS OF OPERATIONAL ANOMALY DETECTION

(71) Applicant: Rockwell Automation Technologies, Inc., Mayfield Heights, OH (US)

(72) Inventors: David C. Mazur, Mequon, WI (US); Nathaniel S. Sandler, Chagrin Falls, OH (US); Jonathan A. Mills, Mayfield Heights, OH (US); Richard Resseguie, Tustin, CA (US); Brian J. Seibel, Grafton, WI (US); Eugene Mourzine, Twinsburg, OH (US); Jakob Methfessel, Georgetown, TX (US); Lisa D. Hughes, Lakewood, OH (US); Kurt D. Sneen, Park City, UT (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 352 days.

(21) Appl. No.: 18/228,398

(22) Filed: Jul. 31, 2023

(65) Prior Publication Data

US 2025/0044773 A1　　Feb. 6, 2025

(51) Int. Cl.
G05B 19/418　　　(2006.01)

(52) U.S. Cl.
CPC ... G05B 19/4183 (2013.01); G05B 19/41885 (2013.01)

(58) Field of Classification Search
CPC .......... G05B 19/4183; G05B 19/41885; G05B 17/02; G05B 13/048
See application file for complete search history.

(56) References Cited

U.S. PATENT DOCUMENTS

| | | | |
|---|---|---|---|
| 10,715,388 | B2 | 7/2020 | Fildebrandt et al. |
| 10,795,347 | B2 | 10/2020 | Sayyarrodsari et al. |
| 11,182,206 | B2 | 11/2021 | Jung et al. |
| 11,474,873 | B2 | 10/2022 | Biernat et al. |
| 11,513,877 | B2 | 11/2022 | Biernat et al. |
| 2009/0089032 | A1* | 4/2009 | Sturrock ............... G05B 17/02 703/7 |
| 2018/0024537 | A1 | 1/2018 | Chauvet et al. |
| 2018/0054469 | A1 | 2/2018 | Simoncelli |

(Continued)

FOREIGN PATENT DOCUMENTS

| | | |
|---|---|---|
| KR | 20200027783 A | 3/2020 |
| WO | 2020184362 A1 | 9/2020 |

OTHER PUBLICATIONS

Liu, Y. et al., "A Data-Centric Internet of Things Framework Based on Azure Cloud," IEEE Access, vol. 7, Mar. 27, 2019, 20 pages.

(Continued)

*Primary Examiner* — Christopher E. Everett

(74) *Attorney, Agent, or Firm* — Fletcher Yoder, P.C.

(57)　　　　ABSTRACT

Systems and methods described herein may involve monitoring an asset based on multiple device models representing the asset as operated in different process states. The systems and methods may involve receiving acquired data corresponding to a current operation of the asset and identifying a device model of the multiple device models based on the acquired data. The device model may correspond to a process state of the different process states, an operational parameter that the asset is operated in, and a training status indication.

20 Claims, 13 Drawing Sheets

(56) References Cited

U.S. PATENT DOCUMENTS

| | | | |
|---|---|---|---|
| 2019/0228327 A1* | 7/2019 | Horesh | G05B 19/41865 |
| 2019/0377604 A1 | 12/2019 | Cybulski | |
| 2019/0384255 A1* | 12/2019 | Krishnaswamy | G05B 23/024 |
| 2020/0136906 A1 | 4/2020 | Bernat et al. | |
| 2020/0150638 A1* | 5/2020 | Mourzine | G05B 19/058 |
| 2020/0249928 A1 | 8/2020 | Zeng et al. | |
| 2020/0278892 A1 | 9/2020 | Nainar et al. | |
| 2020/0311617 A1 | 10/2020 | Swan et al. | |
| 2021/0089354 A1 | 3/2021 | Nixon et al. | |
| 2021/0096551 A1* | 4/2021 | Sayyarrodsari | G06Q 10/06395 |
| 2021/0097456 A1* | 4/2021 | Sayyarrodsari | G05B 19/4183 |
| 2021/0200814 A1 | 7/2021 | Tal et al. | |
| 2021/0218617 A1 | 7/2021 | Palavalli et al. | |
| 2021/0382727 A1 | 12/2021 | Vigil et al. | |
| 2022/0027529 A1* | 1/2022 | Zarur | G06F 30/12 |
| 2022/0027721 A1 | 1/2022 | Thoemmes et al. | |
| 2022/0091572 A1 | 3/2022 | Biernat et al. | |
| 2022/0391259 A1 | 12/2022 | Biernat et al. | |

OTHER PUBLICATIONS

Extended European Search Report for European Patent Application No. 21179775.8, dated Nov. 25, 2021, 9 pages.

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-plcfrom-controller-to-cloud-interface , retrieved on Nov. 29, 2021, pp. 1-6.

European Search Report for European Patent Application No. 21180068.5, dated Mar. 28, 2022,19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022,12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

U.S. Appl. No. 18/227,091, filed Jul. 27, 2023, Jonathan A. Mills.

U.S. Appl. No. 18/227,100, filed Jul. 27, 2023, Jonathan A. Mills.

* cited by examiner

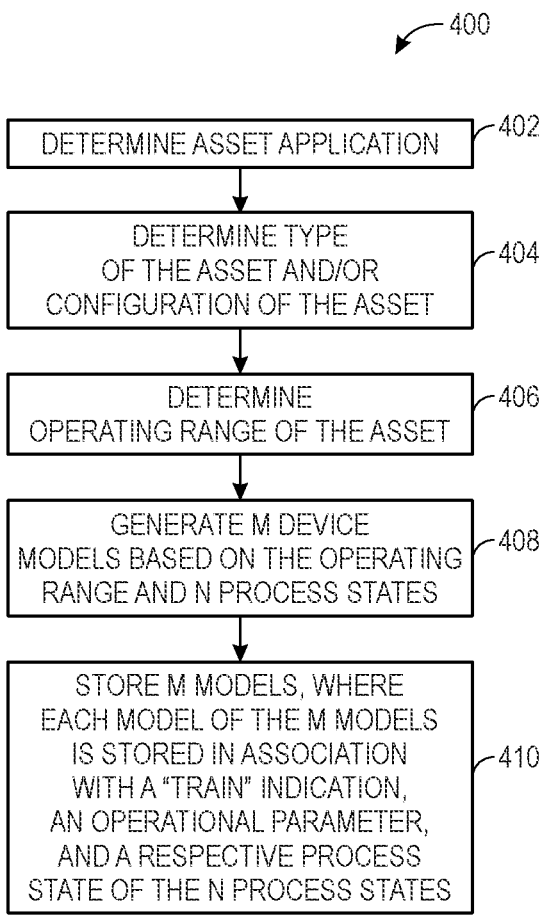

400

DETERMINE ASSET APPLICATION — 402

DETERMINE TYPE
OF THE ASSET AND/OR
CONFIGURATION OF THE ASSET — 404

DETERMINE
OPERATING RANGE OF THE ASSET — 406

GENERATE M DEVICE
MODELS BASED ON THE OPERATING
RANGE AND N PROCESS STATES — 408

STORE M MODELS, WHERE
EACH MODEL OF THE M MODELS
IS STORED IN ASSOCIATION
WITH A "TRAIN" INDICATION,
AN OPERATIONAL PARAMETER,
AND A RESPECTIVE PROCESS
STATE OF THE N PROCESS STATES — 410

FIG. 10

SYSTEMS AND METHODS OF OPERATIONAL ANOMALY DETECTION

BACKGROUND

The present disclosure generally relates to control systems and methods, and more particularly, to control systems that identify operational anomalies based on device data associated with an operational technology (OT) network that includes one or more industrial automation systems.

Industrial automation systems are managed and operated using automation control and monitoring systems (e.g., industrial control systems), particularly in industrial automation environments. Such applications may include controlling a wide range of components, such as valves, electric motors, and so forth, and the collection of data via sensors. Typical industrial control systems may include one or more components, such as programming terminals, automation controllers, input/output (IO) modules, communication networks, human-machine interface (HMI) terminals, and the like.

Some motor current signature analysis and operational deviation detection methods use relatively large amounts of time (e.g., greater than a desirable threshold of time, weeks, months) for training of device models, such as those used in machine learning applications. Industrial operations or processes may even be interrupted when performing this training since the device models are frequently trained on actual operating conditions—this can result in weeks or months of disruption to the process for training, which may undesirably increase costs associated with the industrial automation system. In some cases, these training methods may further increase a time to deploy the machine learning device model since time may be spent waiting for a good time to disrupt the processes for weeks or months. For these machine-learning based monitoring operations, improved systems and methods for training may be desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system may include an industrial automation device that acquires data associated with an operation of an asset. The asset may operate in different process states when handling respective physical materials. The may correspond to multiple device models, where each device model of the multiple device models may correspond to a respective process state and a respective speed range of an operating speed range. The system may include processing circuitry communicatively coupled to the industrial automation device. The processing circuitry may receive the acquired data from the industrial automation device representing a current operation of the asset and may determine a process state corresponding to the current operation of the asset based on the acquired data. The processing circuitry may identify a device model based on the process state and the acquired data, where the device model corresponds to a speed range of the operating speed range. The processing circuitry may determine that the device model includes an indication of a baseline operation of the asset while operated in the process state and at a speed within the speed range. The processing circuitry may compare at least some of the acquired data to the baseline operation to determine a deviation between an expected operation and the current operation.

In another embodiment, a non-transitory, tangible, computer-readable medium may store instructions that, when executed by processing circuitry, cause the processing circuitry to perform operations. The operations may include receiving an indication of an industrial automation device. The industrial automation device may correspond to an asset targeted for operational baseline device modeling. The operations may include determining an application of the industrial automation device. The operations may include determining a configuration of the asset based on the application and determining an operating range of the asset. The operations may include generating multiple device models corresponding to the asset based on the operating range, the application, and the configuration. The operations may include storing the device models in memory in association with indications of process states, operational parameters associated with the operating range, and training status indications, where the industrial automation device may operate in different process states of the process states. The operations may include receiving acquired data from the industrial automation device corresponding to a current operation. The operations may include identifying a device model from the device models based on the acquired data. The device model may correspond to a process state, an operational parameter, and a training status indication.

In a yet another embodiment, a non-transitory, tangible, computer-readable medium may store instructions that, when executed by processing circuitry of an industrial control system, cause the industrial control system to perform operations. The operations may include receiving acquired data from an industrial automation device, where the acquired data indicates a current operation of an asset. The asset may operate in different process states while handling respective physical materials. The operations may include accessing device models associated with indications of the process states, indications of speeds, and training status indications, wherein each device model of the device models corresponds to a respective process state of the process states, a respective speed of the speeds, and a respective training status indication of the training status indications. The operations may include determining a process state of the process states based on the acquired data. The operations may include identifying a device model of the device models based on the process state and the acquired data. The device model may correspond to a speed range of the speeds and a training status indication of the training status indications. The operations may include determining that the device model is trained based on the training status indication, where the device model corresponds to an indication of a baseline operation while trained. The operations may include comparing at least some of the acquired data to the baseline operation to determine a deviation between the baseline operation and the current operation.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein:

FIG. 10 is a flow chart of a method used to configure the container-based MPC system of FIG. 5 to correspond to the device with continuous operations between process states (e.g., pump, blower, fan), in accordance with an embodiment;

DETAILED DESCRIPTION

Figure 1:
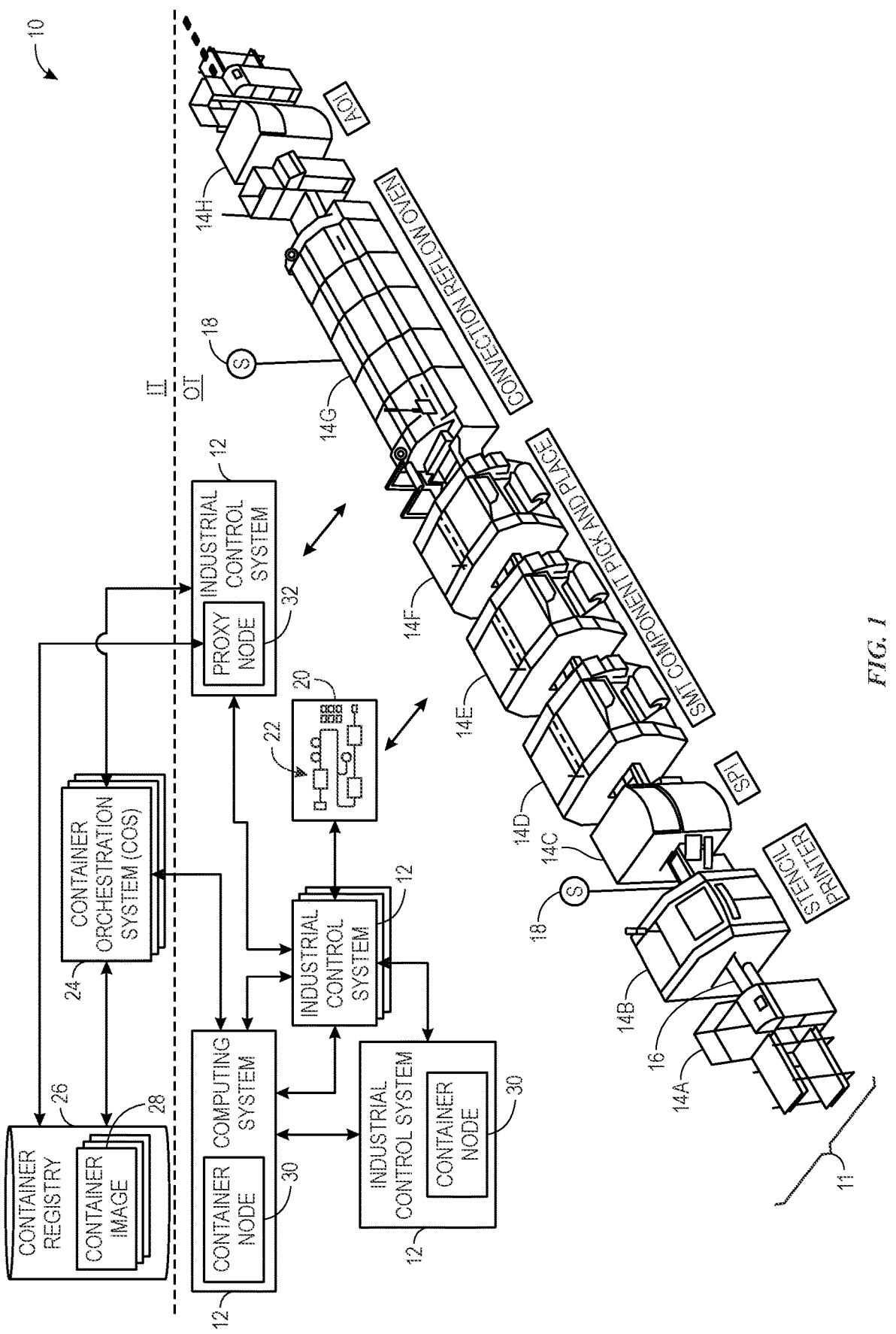
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Some motor current signature analysis and operational deviation detection methods use machine learning device model generation operations that use data gathered over a relatively long period of time on the order of weeks or months, which may be disruptive to a process and expensive (e.g., time, costs) since this training may occur on systems in real-time. Moreover, motor current signature analysis and operational deviation detection methods use a control system or other external data source to define process states of the asset corresponding to the device model by indicating via a control signal when asset has switched loads or into a different operational state. The process state of the asset may play a role with the ability to detect operational deviations since different signatures would be identifiable among the various process states. Systems and methods for training and process state identification that reduce time and/or costs associated with baseline training and/or that operate to identify a process state without a control system may be desired.

Embodiments of the present disclosure are generally directed toward industrial automation systems use implement improved machine learning operations. By using systems and methods described herein, training time to identify a baseline operation of the asset may reduce, be less disruptive to the process, be more accurate in its prediction ability, among other improvements. Furthermore, systems and methods described herein may determine which process state of multiple process states an industrial asset or is operated in without receiving the indication of the process state from a control system. The systems and methods described herein may use acquired data to identify a process state of the asset based on the actual operation of the asset, as opposed to based on process state identification data from a control system, which may enable these systems and methods to be applied to continuous processing and discrete/ batch processing. With the identified process state, the systems and methods also may switch between device models and training or baseline operational modes based on the identified process state and an operational parameter. Training and classification operations may similarly access a same hierarchical index for the asset, enabling a more readily implemented machine learning program that enables the more frequent types of loads and operations to be trained faster in situ without having to disrupt the process to obtain the baseline, as will be appreciated herein.

As also described herein, these operations may be deployed as part of a containerized application (e.g., container-based MPC system), which may be hosted in a cloud-computing environment. Indeed, an industrial automation system may include a container orchestration system in an operational technology (OT) network. The container orchestration system may work in tandem with an informational technology (IT) network and/or industrial control systems to control, monitor, and otherwise manage devices of the industrial automation system. In this way, the container orchestration system may aid collecting and analyzing data from OT devices. Containers include packages of software that may include various elements needed to run in one or more software environments. As a result, containers may be deployed as individual software modules that perform specific operations or functions on the data provided to the respective container. Deploying a container closer to a data source may enable more direct, unprocessed access to data from the data source, which may improve a quality of results being produced by the operations of the containers-such as an accuracy of a prediction made by the container. When the container is done performing the desired operation, it may be spun down or terminated to free up previously consume computing resources. Additional details are discussed below with reference to FIGS. 1-13.

It is noted that reference is made herein to continuous processing and discrete/batch processing. Continuous processing may refer to a sequential flow of materials through a production portion of the industrial automation system, where the sequential flow may be uninterrupted. Continuous processing may involve material inputs flowing in and material outputs flowing out in a relatively uninterrupted continual operation, such as may be the case in petrochemical manufacturing, power generation, and even some food and/or beverage manufacturing. Discrete/batch processing may refer to handling and/or processing of materials in discrete units or batches of materials, such as may be used in automotive manufacturing, electronics assembly manufacturing, and/or some pharmaceutical manufacturing. In these operations, a production process may be divided into respective units, where each material batch may go through a specific set of units before a new material batch is processed. Indicating the change in materials may be relatively straightforward in the discrete/batch processing system since clear transitions between materials being processed occur. Indicating the change in materials may be less straightforward in the continuous processing system since transitions between materials being processed may be less clear and may overlap between an input and output of an asset and/or between different portions of the overall process. Thus, detecting the change in materials based on acquired sensor data may be relatively more reliable indication of material being processed than receiving an indication from a control system when trying to identify what material is handled by an asset in a continuous process. Some industrial automation systems may use one, the other, or a combination of both continuous processing and discrete/ batch processing, depending on specific requirements of products and/or production processes. In any of these examples, as materials change, a respective asset of the industrial automation system may change from one process state (e.g., handling a first material) to another process state (e.g., handling a second material). In this way, an asset may operate in one of several process states over time based on which of multiple materials that it handles, at a given time, while implementing continuous processing and/or discrete/batch processing. The asset, when operated into one of the process states, may operate according to a particular operational curve, like a torque-speed curve. The operational curves may be different for the different process states due to different physical material characteristics (e.g., viscosity, density, particulate content, temperature) of the different materials. Thus, sensing properties of the asset may provide insight into which of the different process states that the asset is operating in at a particular time since the different process states may correspond to one or more different operational curves.

By way of introduction, FIG. 1 is a perspective view of an example industrial automation system 10 controlled by one or more industrial control systems 12. The industrial automation system 10 includes stations 14A through 14H having machine components and/or machines to conduct functions within an automated process (e.g., system 11), such as printed circuit board (PCB) manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14A through 14H, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 22 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 22. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 22 depicts representations of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 22. The person operating and/or monitoring the industrial automation system 10 may reference the display/operator interface 22 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14A through 14H of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed to communicate directly with the respective OT assets.

A container orchestration system, on the other hand, may operate in an information technology (IT) environment. That is, the container orchestration system may include a cluster of multiple computing devices that coordinates an automatic process of managing or scheduling work of individual containers for applications within the computing devices of the cluster. In other words, the container orchestration system may be used to automate various tasks at scale across multiple computing devices. By way of example, the container orchestration system may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system may use configuration files to determine a network protocol to facilitate communication between containers, a storage location to save logs, and the like. The container orchestration system may also schedule deployment of containers into clusters and identify a host (e.g., node) that may be best suited for executing the container. After the host is identified, the container orchestration system may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node 68 that is no longer executing the pod and deploy the pod to another worker node 68 to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes 68 to the master node in the container orchestration system 24. In this way, the master node of the container orchestration system 24 may send commands to the container nodes 30 configurable to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node 68 that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
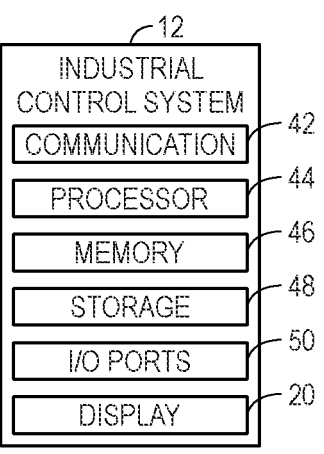
FIG. 2 is a block diagram of an example industrial control system, in accordance with an embodiment.

With the foregoing in mind, FIG. 2 is a block diagram of an example computing device, such as the industrial control system 12, that may be used with the embodiments described herein. The industrial control system 12 may include a communication component 42, a processor 44, a memory 46, a storage 48, input/output (IO) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The IO ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the computing device being the industrial control system 12, it should be noted that the container orchestration system 24, the container nodes 30, the proxy node 32, or any other computing or processing device described herein may also include the same or similar components to perform, or facilitate performing, the various operations described herein. Moreover, it should be understood that the components described with respect to FIG. 2 are exemplary figures and the industrial control system 12 and other suitable computing systems may include additional or fewer components as detailed above.

Figure 3:
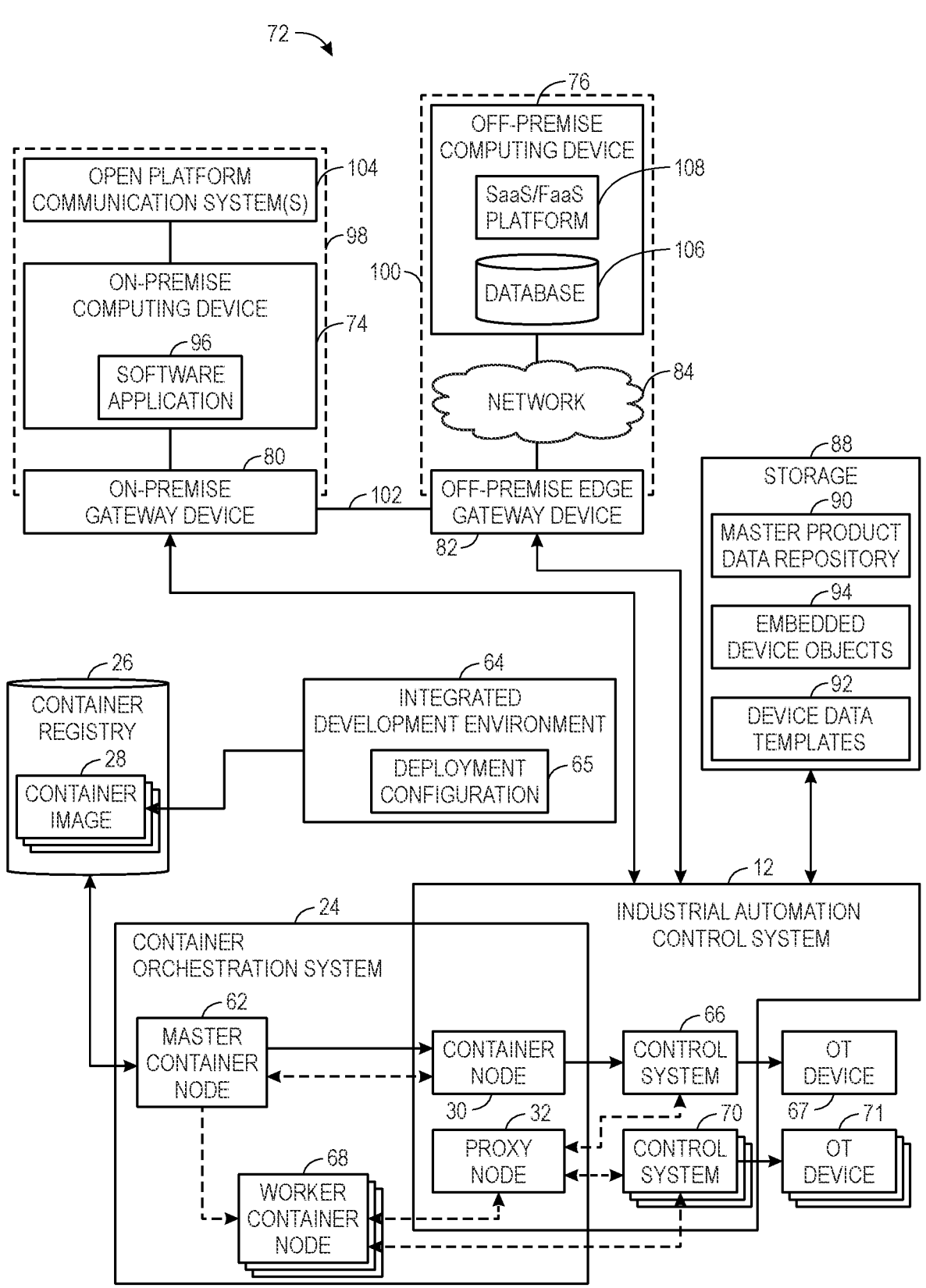
FIG. 3 is a block diagram of an example operational technology (OT) network, a first computing system (e.g., on-premise computing system), and a second computing system (e.g., off-premise computing system), one or more of which may coordinate with a container orchestration system, in accordance with an embodiment.

With the foregoing in mind, FIG. 3 illustrates a block diagram of an example operational technology (OT) network, a first computing system (e.g., on-premise computing system), and a second computing system (e.g., off-premise computing system), one or more of which may coordinate with the container orchestration system 24. The first computing system may correspond computing devices disposed as part of a domain 98, which could be located on-premise of the industrial automation system 10, such as computing device 74, on-premise gateway device 80, an open platform communication system(s) 104, or the like.

The second computing system may correspond to computing devices disposed as part of a domain 100, which could be located off-premise of the industrial automation system 10, such as computing device 76, devices providing a network 84, an off-premise edge gateway device 82, or the like. In some example systems, one or more other devices of the domain 98 may be physically located outside of the industrial automation system 10, such as may be the case if a device is remotely accessing a software application 96 while located at a second physical location different from that of the industrial automation system 10. This may similarly apply to off-premise devices and thus one or more other devices of the domain 100 may be physically located outside of the industrial automation system 10. Thus, when user equipment remotely accesses the software application 96 while located at "home" or at the second physical location, it should be understood that the user equipment may not be automatically considered an off-premise computing device by nature of the user equipment being at the second physical location.

With this in mind, there may be benefits that arise from providing some access to data of the industrial automation system 10 to devices and/or platform services of the domain 100. Indeed, these off-premise systems may have access to higher-levels of information, such as sensed data or operational data spanning two or more industrial automation systems 10, and thus may provide enhanced monitoring or analysis capabilities relative to that of the industrial control system 12 and/or on-premise computing devices.

Indeed, computing devices 74 may include a variety of electronic devices associated with the industrial automation system 10, for example one or more user equipment (e.g., cellular devices) disposed off-premise but communicatively coupled to one or more computing devices disposed on-premise, such as when the user equipment is located at a home of an operator and is accessing data associated with the industrial automation system 10. The industrial control system 12 described above may include the computing devices 74, a gateway device 80, the industrial control system 12, and the edge gateway device 82, where the edge gateway device 82 may communicate with computing devices 76 via a network 84. When accessing web-based applications and/or graphical user interfaces, as described above, the computing device 74 may do so via the network 84 and/or via another network configurable to communicatively couple to the network 84 (illustrated via dashed line). Data generated by the gateway device 80, the computing device 74, the edge gateway device 82, and/or the computing device 76 may be exchanged among the system 72 to perform additional historical data logging, additional analysis, perform security operations (e.g., authenticating a user), or the like. The gateway devices may intercommunicate via wired or wireless communicative coupling 102.

In some cases, the edge gateway device 82 may provide the acquired sensor data to software applications executed outside the industrial automation system 10 on the computing device 76 (e.g., SaaS/FaaS Platform 108, asset anomaly predictor 110). The software applications outside of the industrial automation system 10 may perform real time analysis of the sensor data within the industrial automation device 86 that had been acquired through the edge gateway device 82. As one example, the computing device 76 may provide a software-as-a-service and/or a Function-as-a-Service (SaaS/FaaS) platform 108 via the network 84. In this way, a processor of the computing device 76 may execute instructions stored in memory and/or storage to perform the asset anomaly predictor 110 systems and methods. In this way, the asset anomaly predictor 110 may correspond to instructions stored in non-transitory, computer readable medium of the computing device 76 that, when executed by processing circuitry, cause the computing device 76 to perform operations discussed herein as being performed by the asset anomaly predictor 110. The database 106 may include any suitable storage device, server, or the like, such as a web server (e.g., a unitary Apache installation), an application server (e.g., unitary JAVA Virtual Machine), and/or a database server (e.g., a unitary relational database management system (RDBMS) catalog). The SaaS/FaaS platform 108 provided by the edge gateway device 82 may include platforms such as THINGWORX® registered trademark of PTC. Inc., AZURE® registered trademark of Microsoft Corporation, FIIX® registered trademark of Fiix, Inc., INFLUXDB® registered trademark of InfluxData, Inc. or the like. The SaaS/FaaS platform 108 may manage data stored in the database 106 based on data received from the edge gateway device 82. In some cases, the computing device 76 may correspond to one or more data centers that may include one or more servers, one or more virtual servers, or the like, that each may be operated on one or more physical computing devices. The computing device 76 may provide one or more dashboards via a web-enabled communicative coupling to one or more other computing devices (e.g., computing device 74) to enable presentation of information generated via the SaaS/FaaS platform 108 through outputs of the one or more other computing devices. The network 84 may be any suitable wired or wireless network, such as a network enabled by the Internet or a cloud-based network. The network 84 may be an off-premise network used by the computing device 76 to transmit data to the edge gateway device 82. Using this information, the network 84 may route data and instructions between the computing device 76, database 106, and the edge gateway device 82. The edge gateway device 82 may have access to network information used to communicate with the industrial control system 12 and/or the gateway device 80, such as corresponding internet protocol (IP) address, uniform resource locators (URLs), or the like. In some cases, the edge gateway device 82 may be disposed on-premise of the industrial automation system 10 and be owned by a same entity who owns the gateway device 80 and have connectivity to the network 84.

After obtaining the data from the industrial automation device 86, the computing device 76 and/or the computing device 74 may log the data in real time to perform historical trending and analysis of the data over time. The computing device 76 and/or the computing device 74 may analyze the stored data over time. This process may involve historical trending of the data logged over time. The edge gateway device 82 may communicate via the network 84 to access a software application and/or to log the data in a database 106.

To support or supplement these monitoring and/or control operations, On-premise computing systems, off-premise computing systems, the industrial control system 12, or the like, may generate a request for a container. When doing so the request may be transmitted via a gateway device 80 and/or an edge gateway device 82.

The gateway device 80 and the edge gateway device 82 may be communicatively coupled to each other and to the industrial control system 12. The gateway device 80 may operate on a logical boundary between the industrial control system 12 and a domain 98 which refers to a computing domain in which associated devices within the domain 98 communicate via a first communication network and/or using communication methods corresponding to a first communication method or protocol. The edge gateway device 82 may operate on a logical boundary between the industrial automation system 10 and a different domain 100. The domain 100 may correspond to an off-premise computing domain in which associated devices within the domain 100 communicate via a second communication network and/or using communication methods corresponding to a second communication method or protocol. In both cases, the industrial control system 12 may use a third communication network to communicate with the gateway device 80, the edge gateway device 82, and the industrial automation devices 86. In some cases, the third communication network may be based on operations that expose data to the first communication and/or second communication network in a format and/or protocol that may be consistently consumed between the various networks, such as symbol and template based operations and communication methods. When the domain 100, the domain 98, and/or the industrial control system 12 use different protocols, formats, or networks, communications between the domains may be converted between the various protocols, formats, or networks, such as when transmitting a request for the container and/or receiving or sending data via the gateway devices 80, 82 or any of the networks.

To generate a container that may be referenced via indication in the request, any suitable method may be used. By way of operation, an integrated development environment (IDE) tool 64 may be used by an operator to develop a deployment configuration file 65. One or more IDE tools 64 may be disposed in the domain 98 and/or the domain 100, which may be accessed using computing device 74 and/or computing device 76. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65. In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

The container orchestration system 24 may include a master container node 62 to coordinate the execution and results from the various container nodes. The container orchestration system 24 may include a collection of nodes that are used to achieve a desired state of one or more containers across multiple nodes, where a container may be generated based on operations of the master container node 62 in response to an instruction from another computing device of FIG. 3, in response to a schedule, in response to operations, or the like. A request for the container may identify which generated container stored in the container registry 26 is to be executed. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like.

The master container node 62 that may execute control plane processes for the container orchestration system 24. The control plane processes may include the processes that enable the container orchestration system 24 to coordinate operations of the container nodes 30 to meet the desired states. As such, the master container node 62 may execute an applications programming interface (API) for the container orchestration system 24, a scheduler component, core resource controllers, and the like. The master container node 62 may run an API server to handle requests and status updates received from the container nodes 30. In some cases, the master container node 62 may deploy containers to the container nodes 30 based on the desired state provided in the deployment configuration file 65. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configurable to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk LiveData, EtherNet/IP, Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, Lon Works, DALI, BACnet, KNX, EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a node agent that can register the industrial control system 12 with the master container node 62. The node agent may or may not be the same as the proxy node 32 shown in FIG. 1. For example, the industrial control system 12 may include a programmable logic controller (PLC) that does not support an operating system (e.g., Linux) for receiving and/or implementing requested operations issued by the container orchestration system 24. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial automation system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

In the present embodiments described herein, the control system 66 may thus perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestration system 24 and the OT-based industrial control system 12.

As mentioned above, the industrial control system 12 may access data from one or more of the OT devices 67, 71 (e.g., OT device 67 and/or one or more of OT devices 71) using symbolic data operations enabled by distributed IO products and/or other connected devices. The distributed IO products may include some of the circuitry described with reference to the industrial control system 12. The industrial control system 12 may implement operations or adjustments to operations of OT devices 67, 71 via the control systems 66, 70. In some systems, the controls 66, 70 respectively control one or more OT devices 67, 71. Firmware of the OT devices 67, 71 may query a data source, or receive data from a data source based on the symbol, and store the retrieved datasets as instances of symbols with data type and formatting derived from template object instances that correspond to the symbol represented in the OT devices 67, 71. The data source may be a storage component that the industrial automation device is communicatively coupled to, such as a data repository that receives sensed data from one or more sensors. The OT devices 67, 71 may directly receive sensed data from one or more sensors and/or may correspond to a sensor that generates sensed data. This data received from the storage component or from the sensor may be stored in, or otherwise associated with, a template dataset to enable symbolic access of the data.

OT devices 67, 71 may store associated data into a template dataset associated with a template accessed via symbolic data methods may enhance overall industrial automation system 10 operation. Symbols may integrate at least some of data generated via standard devices and connected devices (e.g., legacy devices without symbolic data compatibility) and data generated via intelligent devices (e.g., devices with symbolic data compatibility) into a consistent format that may be accessed via an information device model format that corresponds to the industrial automation system 10.

Storage 88 may include a master product data repository 90, device data templates 92, and embedded device objects 94. The storage 88 may be any suitable type of data storage device, such as a database, memory, or the like.

The master product data repository 90 may include product capability profiles, computer-aided design (CAD) models and attributes, digital twin models, augmented reality and/or virtual reality libraries, digital presence content management, persistence device models, reporting, graphics, application enablement templates, or the like. The libraries, profiles, models, and so on included in the master product data repository 90 may each reference or operate based on the symbolic data between the master product data repository 90, the industrial automation devices 86, on-premise gateway device 80, off-premise edge gateway device 82, and/or any suitable on- and/or off-premise control and processing systems.

The device data templates 92 may include templates as data models that may include one or more symbols and/or one or more templates. The device data templates 92 may be considered a template data definition and may indicate how to process and/or characteristics of template data relative to one or more templates and/or one or more symbols. Multiple template object instances may be associated together in one template instance when, for example, a parent device includes multiple nested devices. The device data templates 92 may harmonize and standardize different data models (e.g., different vendor data models) with awareness of context data for higher level consumption. Thus, the device data templates 92 may store or associate template object instances, data, and/or context data to each other.

The embedded device objects 94 may correspond to a data structure that associates collections of symbols to a device type. A template may define data types and formatting of data included in the data structure, and the template may be used to decode a set of data associated with the data structure. When registering an industrial automation device 86 to the industrial automation system 10, the industrial control system 12 may receive a data structure of the embedded device objects 94 corresponding to a type of the industrial automation device 86. Indeed, the industrial control system 12 may reference data in a symbol object instance received from the industrial automation device 86, such as identifier data, to match a type of the industrial automation device 86 to one or more of the embedded device objects 94. The industrial control system 12 may use the embedded device objects 94 to generate a template instance for the industrial automation device 86 in which future data generated and future contexts received may be populated into by the industrial control system 12 and/or by the industrial automation device 86. By using the embedded device object 94 that corresponds to the type of the industrial automation device 86, the industrial control system 12 may generate a template object instance consistent in structure with other template object instances generated previously for the same type of industrial automation devices 86.

The embedded device objects 94 may include data structures for logical uses, physical uses, and application uses. For example, data structures of the embedded device objects 94 corresponding to logical uses include flying start templates, motor control templates, variable boost templates, sleep/wake templates, and the like. Expected states that may be included in a template as contextual data for a motor drive include "Running," "Ready," "At Speed," "Active," "At Zero Speed," "Enable On," "Alarmed," "Connected," "Faulted," or the like. The embedded device objects 94 may correspond to power structure templates, motor data templates, predictive maintenance templates, encoder feedback templates, fan and/or pump templates, conveyor templates, hoist and/or lift/templates, and the like. These templates may be referenced when processing generated data. A template may indicate what data to expect in association with a motor, what data to expect in association with switchgear or power distribution equipment, and the like. In some cases, the embedded device objects 94 may correspond to one or more unit-specific templates.

Data associated with the various device-level systems may be accessed by other components of the industrial automation system 10 via the on-premise gateway device 80. The on-premise gateway device 80 may communicate on networks internal to the industrial automation system 10 with devices within the industrial automation system 10. The on-premise gateway device 80 may be locally connected to one or more industrial automation devices 86, the industrial control system 12, or both, and may communicate with the various devices using messages and/or control signals that employ some operational technology (OT) communication schemes, such as the common industrial protocol (CIP). The on-premise gateway device 80 may access symbols stored in the industrial automation devices 86 to process read requests as opposed to waiting to receive identifying information about each device and mapping the identifying information to the requested data for each device to read the requested data. The software application 96 may receive the symbols from the on-premise gateway device 80 and analyze data of the symbols to perform analysis, reporting, historical trending, or the like. The on-premise gateway device 80 may implement control loops based on the symbols and/or may analyze data received via the symbols in real time. Indeed, preparing data based on template object instances and symbol object instances may allow for more efficient processing, uniform comparisons between datasets generated by different devices, or the like. By using systems and methods to reference operational data in a manner using labels understandable to both machine and software, fewer look-up operations may be used to route data from a data source to a data consuming device, and thus fewer computing operations may be used to implement control and processing operations relative to other systems not using symbolic data operations.

Figure 4:
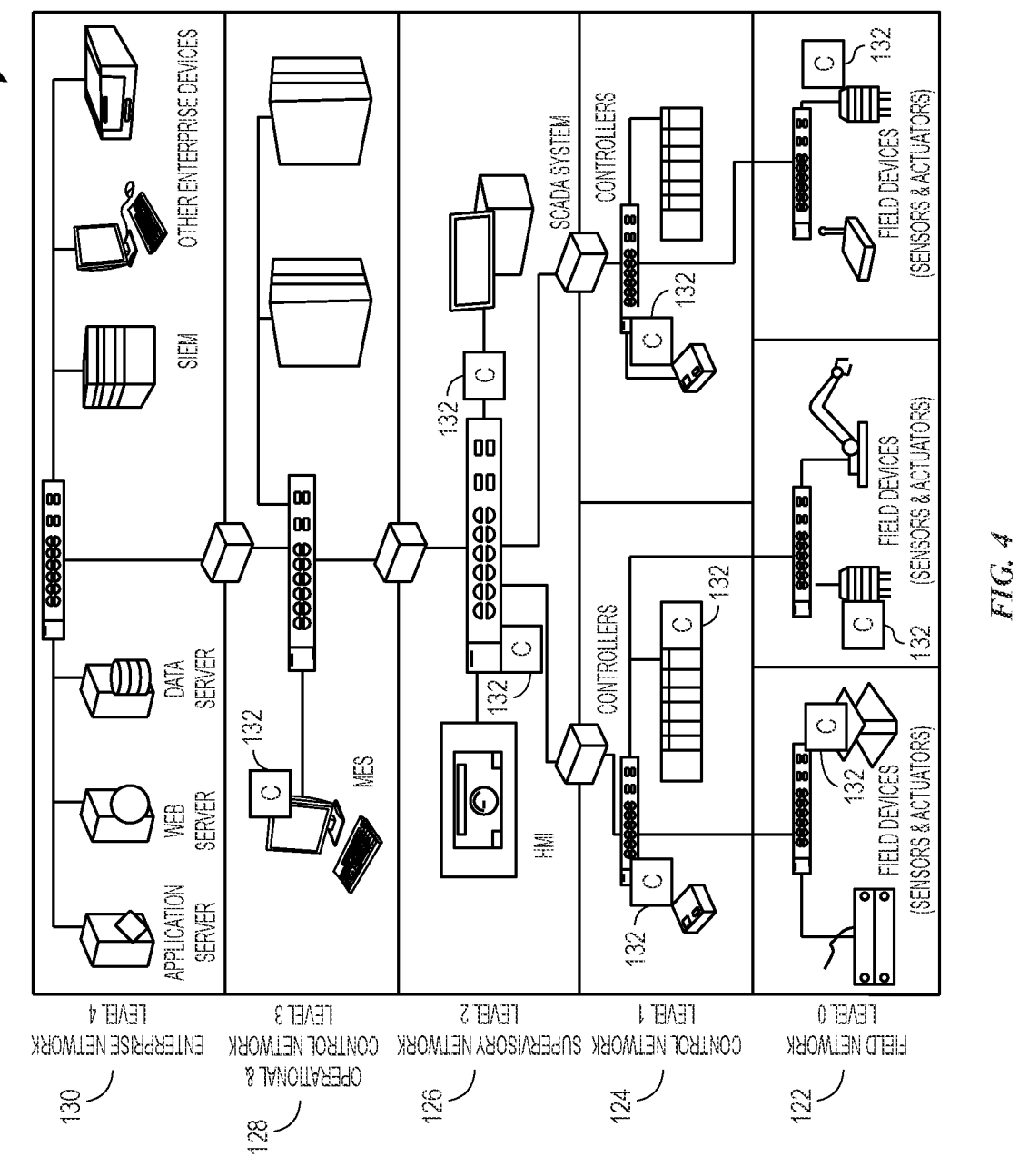
FIG. 4 is a diagrammatic representation of deployed container pods to various hierarchical levels of the industrial automation systems of FIG. 1, in accordance with an embodiment.

With the foregoing in mind, a container orchestration system 24 may determine to deploy one or more containers to one or more lower hierarchy devices of the industrial automation system 10. FIG. 4, for example, is a schematic diagram 120 of the various levels of computing associated with an example industrial automation system 10. The hierarchical levels, in which the industrial automation system 10 may operate, include a field network level 122 (e.g., level 0), a control network level 124 (e.g., level 1), a supervisory network level 126 (e.g., level 2), an operational and control network level 128 (e.g., level 3), and an enterprise network level 130 (e.g., level 4). Different control systems, controllers, software applications, devices, and computing systems may operate with each other within an enterprise to enable organizations to effectively control operations of components in the industrial automation system 10. For example, the physical process in which industrial components (e.g., machines) are employed to physically modify raw materials may be part of the physical process level, which may be controlled or monitored by components in an intelligent device level. The intelligent device level may include sensors, analyzers, actuators, and other instrumentation that may sense and manipulate the physical process. The industrial components at both the physical process level and the intelligent device level may be a part of the field network level 122. The field network level 122 involves the actual production process of transforming raw materials (e.g., grains, wheat) into products (e.g., cereal) as well as sensing and manipulating the production process within the industrial automation system 10 (e.g., food manufacturing plant). Containers deployed to the field network level 122 may be executed by local controller circuitry of respective sensors, actuators, OT device, or the like. It is noted that devices in higher network levels may be able to access data in lower network levels.

The control network level 124 may be positioned at a higher hierarchical level with respect to field network level 122. The control network level 124 may include controllers to provide supervising, monitoring, and controlling operations (e.g., continuous control, discrete control) for the physical process associated with the industrial components. When a container 132 is unable to be deployed to the field network level 122, sometimes the container 132 is deployed to a device in the control network level 124, which may be considered an edge device. The edge device running the container 132 may acquire data produced by devices, sensors, actuators in the field network level 122 and perform processing according to instructions associated with the container 132.

The supervisory network level 126 may be positioned at a higher hierarchical level with respect to the control network level 124 that regulates the controllers of the control network level 124. By way of example, the supervisory network level 126 may include real-time control hardware and software, HMI, programmable logic controller (PLC), supervisory and data acquisition (SCADA) software, and the like. The PLC may be an industrial solid-state computer that monitors inputs and outputs of the industrial automation system 10 and makes logic-based decisions for automated processes of the industrial automation system 10. Further, the SCADA may analyze real or near real-time data from industrial components and subsequently control the industrial components. Containers deployed to the supervisory network level 126 may have access to data acquired or generated by container 132 or devices in lower levels (e.g., field network level 122, control network level 124).

The operational and control network level 128 may be positioned at a higher hierarchal level with respect to the supervisory network level 126. The operational and control network level 128 may include manufacturing application system, which may any suitable IoT system that supports manufacturing processes. In some embodiments, the manufacturing application system may include manufacturing execution system (MES) or a manufacturing operations management (MOM) that manage production workflow to produce the desired products, batch management, laboratory, maintenance and plant performance management systems, data historians, related middleware, and the like. The MES and MOM may involve monitoring data with respect to various time frames, such as duration of communication between components, minutes, seconds, and the like. Containers deployed to the operational and control network level 128 may have access to data acquired or generated by container 132 or devices in lower levels (e.g., field network level 122, control network level 124, supervisory network level 126).

In particular, the MES may include a number of software and hardware components that operate together to monitor the operations of the various components (e.g., databases, servers, devices) that are used to perform the manufacturing operations. The infrastructure of the manufacturing applications system may include the software and hardware components that control the distribution of data and information between various components in the manufacturing application system level and other levels discussed above. By way of example, the components of the manufacturing application system may include a server, a database, a database server, an application server, network controllers, routers, interfaces, and the like. In addition, the components of the manufacturing application system may include software applications and processes that operate to control the flow of data and information between the various components employed by the manufacturing applications systems.

Positioned above the operational and control network level 128, the enterprise network level 130 may manage business-related activities of the manufacturing operation. The enterprise network level 130 may correspond to domain 98. In some cases, the enterprise network level 130 may establish production schedule, material use, shipping, and inventory levels to support the operations monitored by the components (e.g., databases, servers) in the operational and control network level 128. The enterprise network level 130 may also include application servers, web servers, data servers, security information and event management (SIEM), and other enterprise devices. Containers deployed to the enterprise network level 130 may have access to data acquired or generated by container 132 or devices in lower levels.

Devices in each of these levels may correspond to different hierarchical locations within the device hierarchy. Hierarchical locations may be generally arranged based on the levels. A hierarchical location of a device may indicate the physical or logical placement of the device within the industrial automation system 10 device hierarchy (e.g., represented via schematic diagram 120). When designing and/or managing control operations within the industrial automation system 10, the hierarchical locations may be considered since the hierarchical locations may impact latency, communication speeds, and/or power consumption.

As mentioned above, a container 132 deployed in the industrial automation system 10 may be a data collecting (e.g., data acquisition) process that monitors for specific data produced by one or more devices for a threshold duration of time or quantity of data, may perform one or more operations based on computer-implemented instructions associated or contained within the infrastructure of the container 132, or the like. Once a threshold amount of data is gathered or a threshold amount of time has been reached, or data is received from a data source, the container 132 may commence processing, analysis, and/or transmission of the data to be sent to a different device in a same or different level. In this way, some container 132 may be non-perpetual operations that have distinct start and end times. When a container 132 completes its operation, it is terminated and no further computing resources or memory are dedicated to that container 132 at the deployed device.

Deploying the one or more containers 132 may be based on a trigger event, such as receiving scheduling metadata, receiving a command from an industrial automation device, or detecting a device being commissioned in the industrial automation system 10, or the like. These examples and others are described herein. However, it should be understood that other deployment conditions or considerations may be used when determining whether to deploy a container 132 to another device in the hierarchy.

Figure 5:
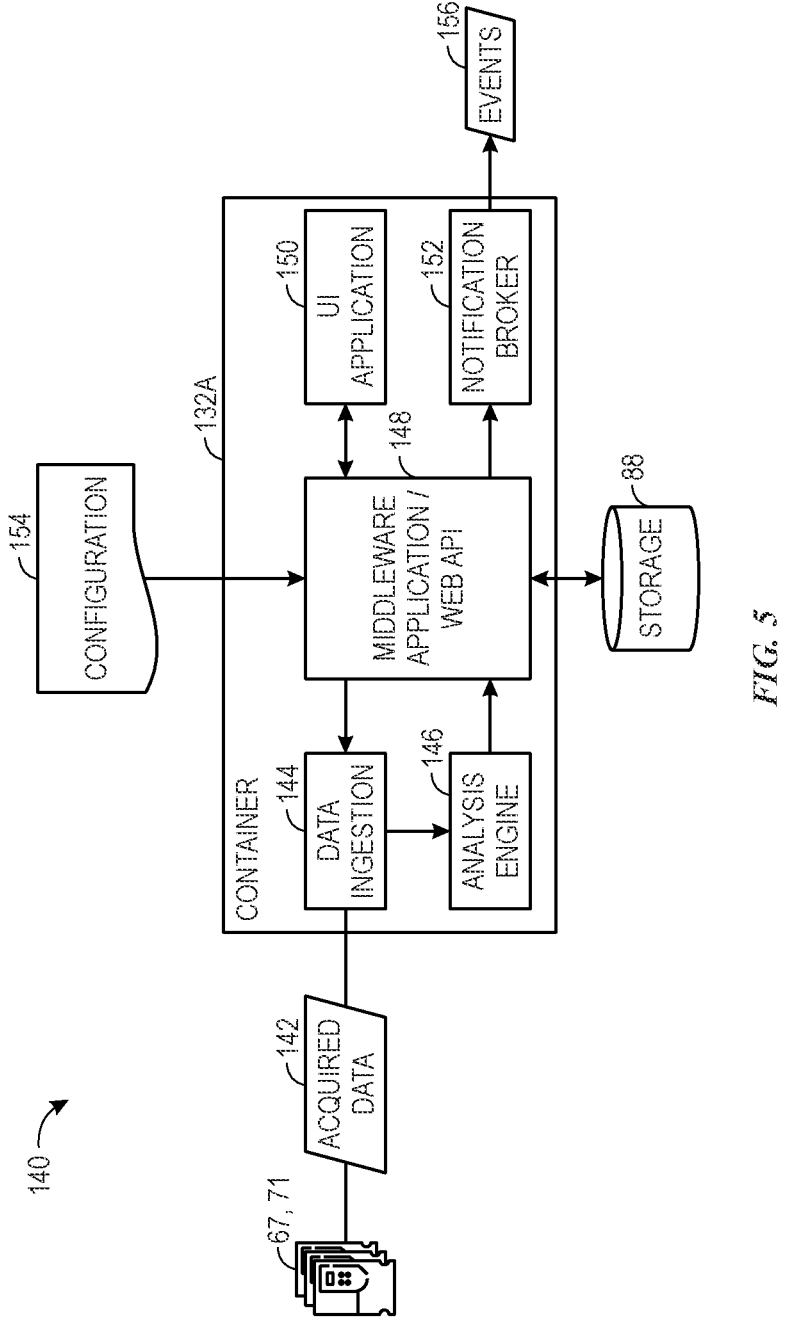
FIG. 5 is a diagrammatic representation of a container-based model predictive control (MPC) system deployed in one or more of the systems of FIG. 3, in accordance with an embodiment.

FIG. 5 is a diagrammatic representation of a container-based model predictive control (MPC) system 140 (e.g., a container-based monitoring application) deployed in one or more of the systems depicted in FIG. 3 and/or FIG. 4. Indeed, the MPC system 140 may be included in a container 132A, such as part of one of the containers 132 of FIG. 4 deployed in a suitable hierarchical level. In some cases, the MPC system 140 is an application accessible via the platform 108. In some cases, the MPC system 140 may be accessible via a management framework application provided via a cloud provider as part of a software offering.

The MPC system 140 may obtain data from the industrial automation system 10, such as data 142 acquired from or related to OT devices 67, 71 or other assets of the industrial automation system 10. The MPC system 140 may predict anomalies in an operation of the industrial automation system 10 based on the obtained data and an analysis operation. The analysis operation may involve one or more device models corresponding to the asset associated with the obtained data. When such an anomalous operation is detected, the MPC system 140 may generate a notification and/or data indicative of the detected operation (e.g., one or more event(s) 156). The one or more events 156 may correspond to an alarm and/or indicate an alarm status (e.g., "alarm" state, "normal" state, "off" state), or the like. The notification may include a link to a graphical user interface to acknowledge the detection and/or label the detected anomalous operation as deemed appropriate.

To elaborate, various systems implemented via the MPC system 140 are described below. In one example, all functionality (except the storage 88) is intended to be hosted in a single container. However, it should be understood that in other systems it may be desired to host one or more portions or operations of the MPC system 140 in different containers, in one or more containers, in a combination of container-based operations and non-container operations, or the like. Benefits of using one container to deploy the MPC system 140 may be the ability to selectively use computing resources for the monitoring operation and to terminate the MPC system 140, freeing up the computing resources, once the monitoring operation ends or is idle. Other technical effects from using the container-based MPC system 140 may be described and relied upon herein.

The MPC system 140 may include a data ingestion component 144, an analysis engine 146, a middleware application 148 (that may enable a web-based API), a user-interface (UI) application 150, a notification broker 152, or the like. It should be understood that alternative, fewer, or additional systems or applications may be associated with the MPC system 140. The data ingestion component 144, the analysis engine 146, the middleware application 148, the UI application 150, and/or the notification broker 152 may correspond to separate processes built as respective binary or associated with respective instructions executable to perform the operations described herein. In this way, the respective processes may not be built into separate containers in some systems.

The middleware application 148 may receive a configuration 154. The configuration 154 may be a file provided to the container 132A providing the MPC system 140 via environmental variables. The middleware application 148 may read the configuration 154 via the web-based API, where the configuration 154 is passed in via environment variables. The middleware application 148 may write data of the configuration 154 to a database of the storage 88, as well as may initialize its various subcomponents based on the data of the configuration 154. The middleware application 148 may also operate as a data controller to aid in abstracting other components based on configurations and/or data accessible in the storage 88.

The data ingestion component 144 may receive the acquired data 142 from target automation devices, such as OT devices 67, 71. Once received, the data ingestion component 144 may format the acquired data 142 to meet protocol or formatting configurations of the middleware application 148 and/or the analysis engine 146. It is noted that the container 132A may be deployed to the edge gateway 82. Thus, the data ingestion component 144 may perform data processing operations on behalf of the edge gateway 82 for preparing the acquired data 142 into a protocol or format able to be handled by computing devices of domain 100.

Analytics operations performed by the middleware application 148 and/or the analysis engine 146 may use relatively high-speed data (e.g., greater than threshold) from target assets, such as OT devices 67, 71. The high-speed data may correspond to like trend data obtained at a sensing frequency greater than or equal to a threshold frequency of sensing. In some cases, the MPC system 140 may receive the data from one or more containers 132 deployed at compute surfaces of the target assets and/or in proximity to the target assets (e.g., deployed as close to the target asset as permitted or suitable). In some cases, the data ingestion component 144 may configure one or more common industrial protocol (CIP) objects at one or more target automation device, such as test points, to facilitate the collection of the data, where may be obtained at speeds higher when acquired closer to the target asset. In this way, high-speed trend data may be obtained at the target automation device.

The analysis engine 146 may receive ingested data from the data ingestion component 144 (e.g., the processed acquired data 142 output from the data ingestion component). The analysis engine 146 may perform one or more data manipulation operations on the ingested data. The data manipulation operations may include one or more normalization operations, filtering operations, sorting operations, sampling operations, splitting operations, or the like. Once processed, algorithmic logic of the analysis engine 146 may perform analytic operations based on the processed data to detect whether one or more anomalies are present in an operation or the target automation device. The algorithmic logic may be packaged as a library and may perform one or more machine learning-based operations on the processed data. In this way, processing to the ingested data performed by the analysis engine 146 may correspond to machine learning preprocessing operations. The machine learning preprocessing operations may include data cleaning operations, feature selection operations, feature scaling operations, data transformation operations, encoding operations, or the like. Indeed, any suitable analytic operation and/or processing operation may be performed via the analysis engine 146.

In some cases, the analysis engine 146 may train a device model to indicate a baseline operation of an asset while in a process state. Since the asset may operate in multiple process states, the asset may correspond to multiple device models respectively indicating the baseline operation of the asset in the multiple process states. The baseline operation may correspond to a normal operation that has come to be an expected operation through repeated training and/or monitoring over time, where a number of repeated training may correspond to "training iterations" in FIG. 13. When the asset is a motor, such as a motor driven by an adjustable speed motor drive corresponding to a pump, fan, blower, or the like, the asset may operate in a process state based on what material is being handled by the asset and operation of the asset may change based on a speed at which that material is handled, which may change an amount of torque or other parameter affecting the asset. A respective device model trained and accessed by the analysis engine 146 may correspond to a respective process state and a respective operational parameter (e.g., speed). As will be appreciated, the MPC system 140 may, via the analysis engine 146, determine which device model to access (e.g., when monitoring an asset based on the device mode, when training a device model for the asset) based on determining in which process state and at which speed a target asset is currently operated. This determination may be based on acquired data that may be used by the MPC system 140 to determine what material is being handled by an asset and at what speed, enabling the corresponding device model to be read from memory.

With this in mind, device models of an asset may correspond to any suitable indication of an expected operation for that asset. In some cases, a device model may indicate an expected voltage signal over time, an expected torque over time, an expected current over time, or the like, where time may correspond to a time window. A device model may correspond to a look-up table of example sensor data at a specific time that may indicate normal operation. A device model may capture a signal or waveform that is indicative of a normal operation of that asset which in a corresponding process state and label that signal or waveform as an expected operation. Multiple signals or waveforms over time may be acquired and processed to generate an indication of an expected operation of the asset, such as a mean, a mode, or a median of the signals or waveforms. Any suitable relationship may be indicated and used to train the device model. For example, a Hanning window or other Fourier transform may be used to process acquired data before training the device model.

The UI application 150 may correspond to a "runtime" interface. The interface provided by the UI application 150 may enable a computing device of FIG. 3 to present a graphical user interface (GUI). The GUI may enable configuration of assets and drives to be monitored (e.g., as a target automation device), labeling and/or classifying of a detected anomalous operation, management of various aspects or configurations referenced by the MPC system 140, or the like. Furthermore, the notification broker 152 may generate and send one or more notifications to the GUI to indicate a detected anomalous operation via a visualization. Other methods may be used to notify via the notification broker 152 in response to an event 156 notification.

To elaborate, the notification broker 152 may be responsible for processing various events 156 generated in the MPC system 140 and then generating one or more events 156 based on indications of rules stored in the storage 88. An event 156 may include an amount of data less than an amount of data received as the acquired data 142. The notification broker 152 may transmit one or more events 156 to one or more computing devices (e.g., associated with the domain 98, associated with the industrial automation system 10) based on one or more indications of user profiles. Rules may associate a computing device to an indicated delivery method of notification. For example, a respective rule may indicate a relationship between a client device, a user profile, a system, a type of device, a computing device, or the like, and between a type of delivery method by which to send the notification. When the MPC system 140 is disposed in the cloud and/or provided by the computing device 76, the notifications may be sent by the notification broker 152 via electronic mail, text message, and/or another messaging application. When the MPC system 140 is provided by the computing device 74 and/or is accessed by a device without internet, the notifications may be sent by the notification broker 152 via a user-definable type (UDT), which may be mapped to one or more HMIs, alarms, control system operations, or the like. In this way, a computing device without internet connection may be sent event 156 notifications from the MPC system 140 based on the notification broker 152 writing the event 156 to the UDT as opposed to receiving the event 156 via an Internet-enabled connection or cloud-based connection. It is noted that the UDT may be used to provide a standard structure to write data to and read data from.

Although shown in FIG. 5 as corresponding to one MPC system 140, it should be understood that a single notification broker 152 may support multiple analysis engines and/or MPC systems 140. Indeed, the notification broker 152 and/or the storage 88 may be shared by one or more MPC systems 140, one or more containers 132, or the like. Furthermore, the one or more MPC systems 140, the one or more containers 132, and the like may be optionally operated on or executed on separate hardware. In one example, a computing device 74 may browse via an internet-enabled browsing operation to link to a reverse proxy and/or load balancer, which may be based on the middleware application 148. The reverse proxy and/or load balancer may communicatively couple to a scaled out UI involving two or more UI applications 150. The UI applications may respectively couple to the storage 88. Based on data provided from the different UI applications 150, separate data ingestion and analysis operations may occur based on separate instantiations on the data ingestion component 144 and the analysis engine 146. In this way, multiple MPC systems 140 may be scaled to support different parallel analysis operations while sharing some functionality among the various scaled systems. The separated data ingestion and analysis operations may correspond to respective device collections (e.g., one or more OT devices 67, 71 that may or may not overlap in groupings) and share a notification broker 152 responsible for communicating events 156 back to the computing device 74. In this way, different UI applications 150 may enable different configurations and/or data to affect separate data ingestion and analysis operations, which may share a notification broker 152 and storage 88. It is noted that the storage 88 in this example may be considered a shared storage and state manager, which may be written to by the various analysis engines 146 and read from by the notification broker 152 to coordinate the generation of the events 156 based on the different analysis results. As mentioned above, the notification broker 152 may provide notification via electronic mail, text message, or the like to one or more computing devices associated with the industrial automation system 10 and/or the domain 98.

Figure 6:
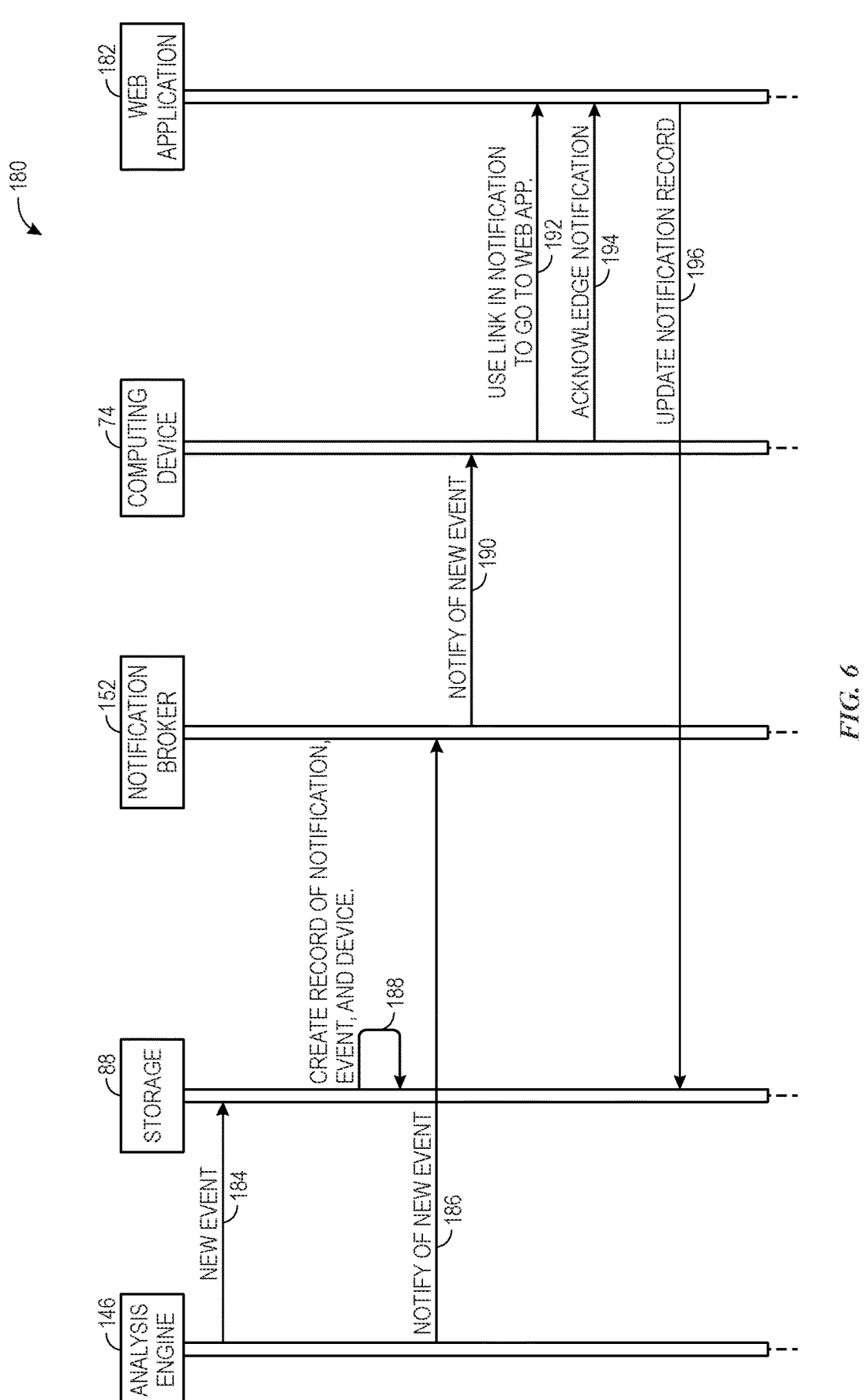
FIG. 6 is a flow chart of a method that the container-based MPC system of FIG. 5 may perform when detecting an event, in accordance with an embodiment.

To aid in visualization of operations of MPC system 140, an example notification sequence is illustrated in FIG. 6. FIG. 6 is a sequence diagram 180 illustrating the MPC system 140 detecting and generating an event 156. Operations illustrated in the sequence diagram 180 are associated with the analysis engine 146, the storage 88, the notification broker 152, the computing device 74, and a web-based application 182. It is noted that the sequence diagram 180 may not represent an exhaustive indication of described herein or able to be performed by the industrial automation system 10 based on and/or in conjunction with the MPC system 140.

With keeping descriptions of FIGS. 5-6 in mind, at operation 184, the analysis engine 146 may transmit an indication of a new event to the storage 88, which stores (at operation 188) the indication of the new event as a record. The indication of the new event may include metadata, such as an indication of a notification, asset identifier, device identifier, device type, a timestamp or the like, and thus the record in storage 88 may include some or all of the metadata. The analysis engine 146 may also transmit the indication of the new event at operation 186 to the notification broker 152. The notification broker 152 may notify, at operation 190, the computing device 74 in response to receiving the indication of the new event from the analysis engine 146. The notification broker 152 may notify the computing device 74 based on its indicated preference as the event 156. The notification broker 152 may adjust the notification method based on the metadata transmitted with the indication at operation 186. Once notified, the computing device 74 may, at operation 192, use a link in the notification from the notification broker 152 to navigate to the web-based application 182. In the web-based application 182, the computing device 74 may, at operation 194, transmit an input acknowledging the notification from the notification broker 152. Once acknowledged, the web-based application 182 may, at operation 196, update the notification record in the storage 88 that was previously generated at operation 188.

In some systems, operations of the storage 88, the notification broker 152, the computing device 74, and/or the web-based application 182 may occur at least partially in parallel, which may increase an efficiency and speed in which the computing device 74 is delivered the notification of the event. For example, operations 184 and 188 may be at least partially in parallel to operations 186, 190, 192, and/or 194.

In some systems, each detected anomaly by the analysis engine 146 may not trigger a new event at operation 184. The analysis engine 146 may perform additional monitoring rules and/or filtering operations before generating the new event at operation 184 in response to detecting the anomalous operation.

In the case that the computing device(s) 74 are not connected to the internet, notifications of operation 190 may be sent to a "application client" and/or a UDT, as described above. Furthermore, it is noted that these notification systems and methods may be used in combination with any suitable processing operation of the analysis engine 146 to identify and generate the indication of the new event at operation 184. For example, the analysis engine 146 may compare a baseline operation of an asset to a current operation of an asset to identify whether the asset is operating as expected or is anomalously operating. When the asset is deemed as anomalously operating, the analysis engine 146 may generate the indication of the new event at operation 184.

Keeping the foregoing in mind, systems and methods that improve analysis engine 146 monitoring operations are described herein. These systems and methods may use notification methods of FIG. 6 and/or the systems of FIG. 5 to detect anomalous operations.

To elaborate, some analysis and deviation detection operations may use machine learning operations. These machine learning operations may use a relatively long amount of learning time (e.g., greater than a desired threshold amount) to determine baselines and understand normal operating conditions of the asset and/or industrial automation system 10. These machine learning operations may use a dedicated training time period, as opposed to in situ training, and may be based on a controller identifying (or an another data source) define process states. The process state may correspond to a batch or material being processed. Using the dedicated training time period and/or receiving the indications of the process states of operation being monitored may be undesirable due to potential for process disruption, delays, or additional communication or infrastructure being used to perform training and analysis operations.

With this in mind, the systems and methods described with reference to FIG. 7 may be used with in situ training of a machine learning device model, where processes may not be disrupted for training. Furthermore, these systems and methods may not use an indication of a process state from the controller. These systems and methods may discern a process state based on sensed data at a time of training, making the methods suitable for monitoring of continuous processes as well as discrete/batch processes.

Figure 7:
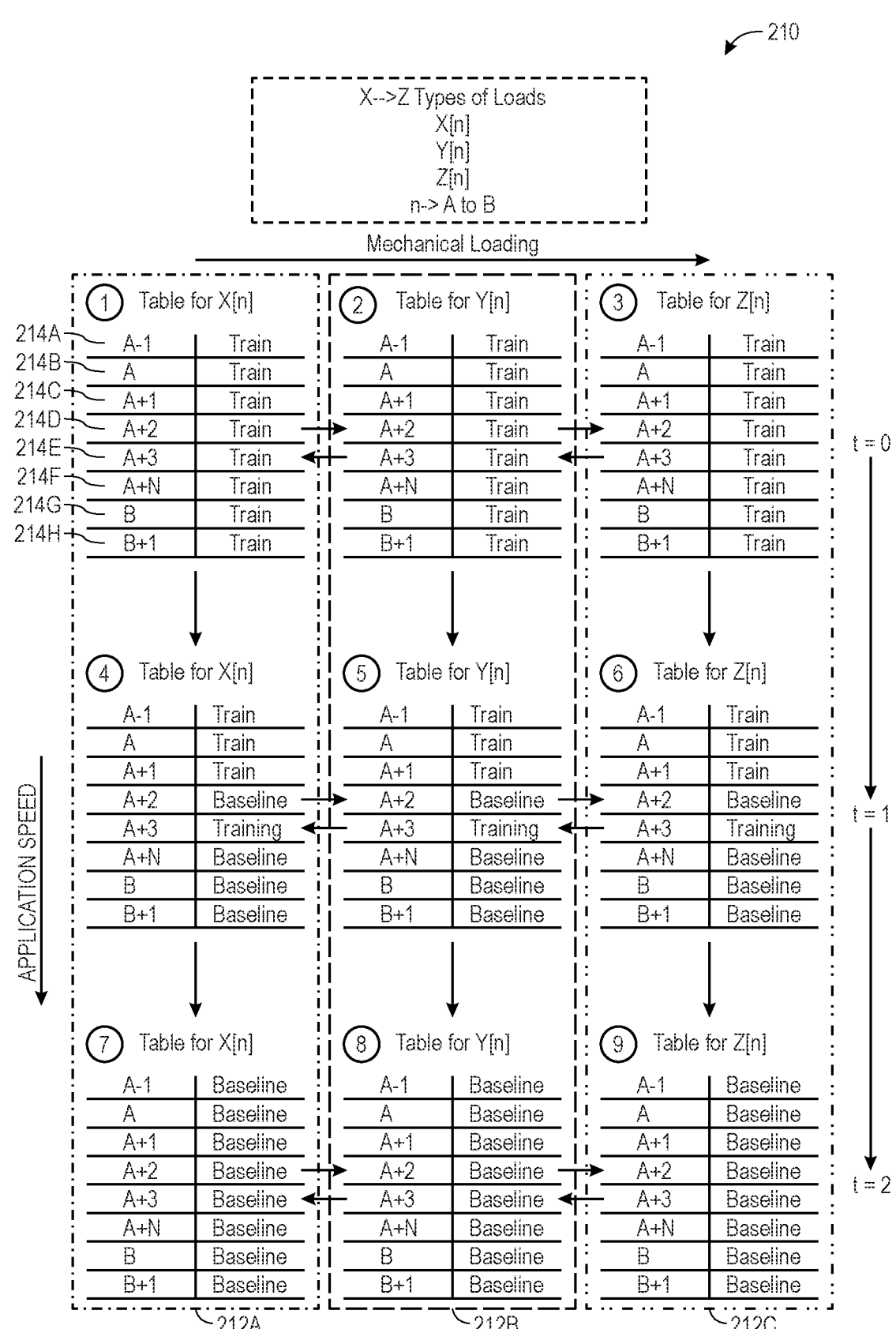
FIG. 7 is a diagrammatic representation of training operations performed by the container-based MPC system of FIG. 5 to train a device model for one or more loads and for one or more operational parameters, in accordance with an embodiment.

To elaborate, FIG. 7 is a diagrammatic representation 210 of hierarchical indexes of an asset over time as training operations performed by the container-based MPC system 140 to train a device model of the asset, where the asset may be one or more OT devices 67, 71, or other suitable industrial device capable of being monitored. Hierarchical indexes associated with the asset may be stored in the storage 88 or another suitable memory. The hierarchical indexes may indicate different operations or performances of the when in different process states 212 and when operated at different operational parameters 214. Each row of each table of the hierarchical indexes may correspond to a respective device model for the asset. The various respective device models may be trained based on in situ data associated with the asset to indicate a baseline or normal operation of the asset when operating in a respective process state 212 at a respective operational parameter 214. For example, trained device models are illustrated as being associated with a "baseline" indication in the hierarchical index. Before any training occurs, device models are illustrated as being associated with a "train" indication in the hierarchical index. When the MPC system 140 (e.g., via the analysis engine 146) is training the device model, the device models are illustrated as being associated with a "training" indication in the hierarchical index. The MPC system 140 may change, via the analysis engine 146, the "training" indication to the "baseline" indication in response to a threshold amount of normal operation data has been received.

To elaborate, the hierarchical indexes may correspond to one or more process states 212 (process state 212A, process state 212B, process state 212C) and one or more operational parameters 214 (operational parameter 214A, operational parameter 214B, operational parameter 214C, operational parameter 214D, operational parameter 214E, operational parameter 214F, operational parameter 214G, operational parameter 214H). It is noted that the asset may, overtime, handle the one or more different loads in states 212 (corresponding to X, Y, Z) at one or more different operational parameters 214 (corresponding to an array of operational parameters, n→A to B). For example, a pump at a first operational frequency (e.g., first operational parameter 214) to move a first load of a first viscosity (e.g., first process state 212) may have a different operation than when it moves a second load having a second viscosity (e.g., second process state 212) at the same first operational frequency (e.g., the first operational parameter 214). Operation may further differ when the pump is used to move the first load (e.g., first process state 212) at a second operational frequency (e.g., the second operational parameter 214). Thus, a combination of a respective process state and a respective operational parameter may be used to navigate the hierarchical index to access the device model. For example, when the asset is a motor, the respective process state 212 of the motor may correspond to a physical characteristic of a load (e.g., thick material being moved via the motor may be a physically heavier load relative to a thinner or more viscous material) and the respective operational parameter 214 that the motor is operated at may be a rotation per minute (RPM) parameter. As the operational parameter changes, the respective process state 212 space referenced changes. As the respective process state 212 changes (e.g., when the load changes), the respective process state 212 space referenced changes.

Although described in terms of three loads, it should be understood that an asset may correspond to one or more states 212 and one or more operational parameters 214. For example, a pump may move four different substances (e.g., liquid A, liquid B, water, liquid C) corresponding to the different process states 212 (e.g., loads) and have four different pump signatures corresponding to the different substances, where for any one of the four different substances the pump may be operated at a different operating parameter corresponding to frequencies, and thus a lowest frequency (e.g., A–1), a middle frequency (e.g., A+2), or a highest frequency (e.g., B+1), or a frequency between those values (e.g., A, A+1, A+3, A+N, B).

Furthermore, although described herein as operational parameters 214, it should be understood that these values may refer to value ranges within a larger operational range. For example, a frequency A (e.g., operational parameter 214B) may refer to one frequency within an operating speed range, like 51.5 Hertz (Hz), or a range of frequencies within the operating speed range, like 51 Hz through 52 Hz, depending on the system. Any suitable range or values may be used as the operational parameters 214 by which to index the various device models.

Figure 8:
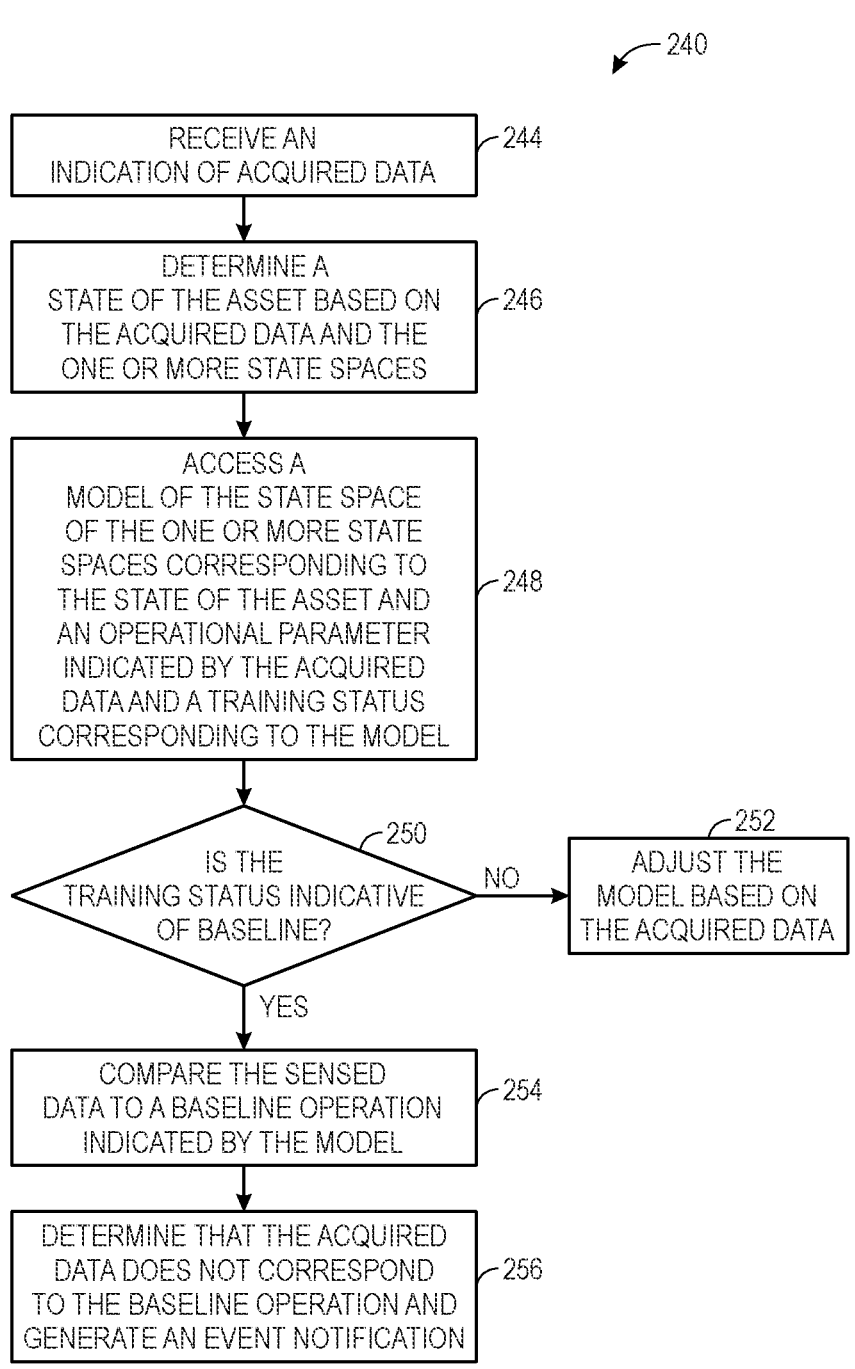
FIG. 8 is a flow chart of a method that the container-based MPC system of FIG. 5 may perform as part of the training operations of FIG. 7 and/or detection operations, in accordance with an embodiment.

By using systems and methods of FIGS. 7-8, a device model of an asset may be trained using data acquired in association with the asset operating at a normal operation in situ in the process. This may lead to various improvements in device behavior modeling, including increase speed of modeling, more accurate models since the modeling may occur within the real process, or the like. Indeed, such training and monitoring operation operations may be discussed further with FIG. 8.

FIG. 8 is a flow chart of a method 240 that the container-based MPC system 140 may perform as part of the training operations illustrated via FIG. 7 and/or detection operations. Although the following description of the method 240 is described as being performed by the MPC system 140 via the analysis engine 146 and the notification broker 152, among other systems of FIG. 5, it should be understood that any suitable computing device and/or the industrial control system 12 may perform some or all of the operations described herein. In addition, although the method 240 is described in particular order, it should be understood that the method 240 may be performed in any suitable order.

At block 244, the MPC system 140 may receive an indication of the acquired data 142 via the data ingestion component 144. The acquired data 142 may be received based on a common industrial protocol (CIP) path, an IP address, a device identifier, a user-defined type tag, any combination of these, or other suitable device identifying and/or data pathway identifying data. The MPC system 140 may receive the CIP path, IP address, device identifiers, or the like, from input(s) received via a graphical user interface, such as those shown in FIGS. 11-13, from accessing a memory, from the industrial automation system 10 (reported by the device itself or a corresponding control system) reporting the data, or the like. Thus, the acquired data 142 may indicate which of the one or more process states that the asset was operating in when the acquired data 142 was sensed or obtained. At block 246, the MPC system 140 may, via the analysis engine 146, determine a process state based on the acquired data 142.

At block 248, the MPC system 140 may, via the analysis engine 146, access a device model of the process state 212 determined at block 246. The device model may be selected based on which of the operational parameters 214 corresponds to the acquired data 142. In this way, the MPC system 140 selects the device model based on the determined process state and the operational parameter indicated by the acquired data 142. The selected device model corresponds to an indication of training status, such as an indication of "train," "training," or "baseline" from FIG. 7 (e.g., "baseline" indication).

At block 250, the MPC system 140 may, via the analysis engine 146, determine a training status of the selected device model, which may indicate whether the selected device model is indicative of a baseline operation of the asset. When the selected device model is not indicative of the baseline operation, the acquired data 142 may be used by the MPC system 140 at block 252 to adjust the selected device model when the acquired data 142 indicates a normal operation of the asset. This may permit the selected device model to be trained while the asset remains in situ in the process and operating as intended in the process (e.g., not in a training mode). However, when the selected device model is indicative of the baseline operation, the MPC system 140 may compare the acquired data 142 to a baseline operation indicated by the device model at block 254. Based on the comparison, the MPC system 140 may determine whether a normal operation of the device model is represented by the acquired data 142. That is, whether the acquired data 142 is represented in the baseline operation indicated in the device model. When the acquired data 142 corresponds to a normal, baseline operation, the MPC system 140 may not generate an event 156 and/or may send the acquired data 142 for additional processing, like additional validation. However, at block 256, when the acquired data 142 corresponds to an anomalous operation, the MPC system 140 may generate the event 156 notification via the notification broker 152. The event 156 may trigger a validation operation to occur to enable labeling of the anomalous operation to occur. Over time, the analysis engine 146 may update the device model used based on the labeling of one or more anomalous operations.

In some embodiments, one or more device models may be retained or similarly referenced for replaced devices or after a device has been power cycled. Furthermore, although described herein as training an otherwise untrained set of device models of an asset, it should be understood that in some systems a partially trained device model may use in situ performance data to train the device model to that asset in that specific process. By reusing trained device models determined as still applicable to an asset in situ in a process and/or by using partially trained device models, a total time of training and/or bringing the replaced device online again after a device replace may be reduced.

Keeping the foregoing in mind, it may be desired to apply methods of FIG. 8 to drive systems and/or other operations based on continuous operational control. Continuous operation of a drive system may refer to the ability of certain industrial asset to continually operate to move different loads without discrete state changes. For example, a pump may transfer fluids, gases, plastic pellets, or the like from one location to another and may encounter changes in load as a demand for the material changes and/or as the load within a process changes, such as when what substance is in a tank is changed.

Figure 9:
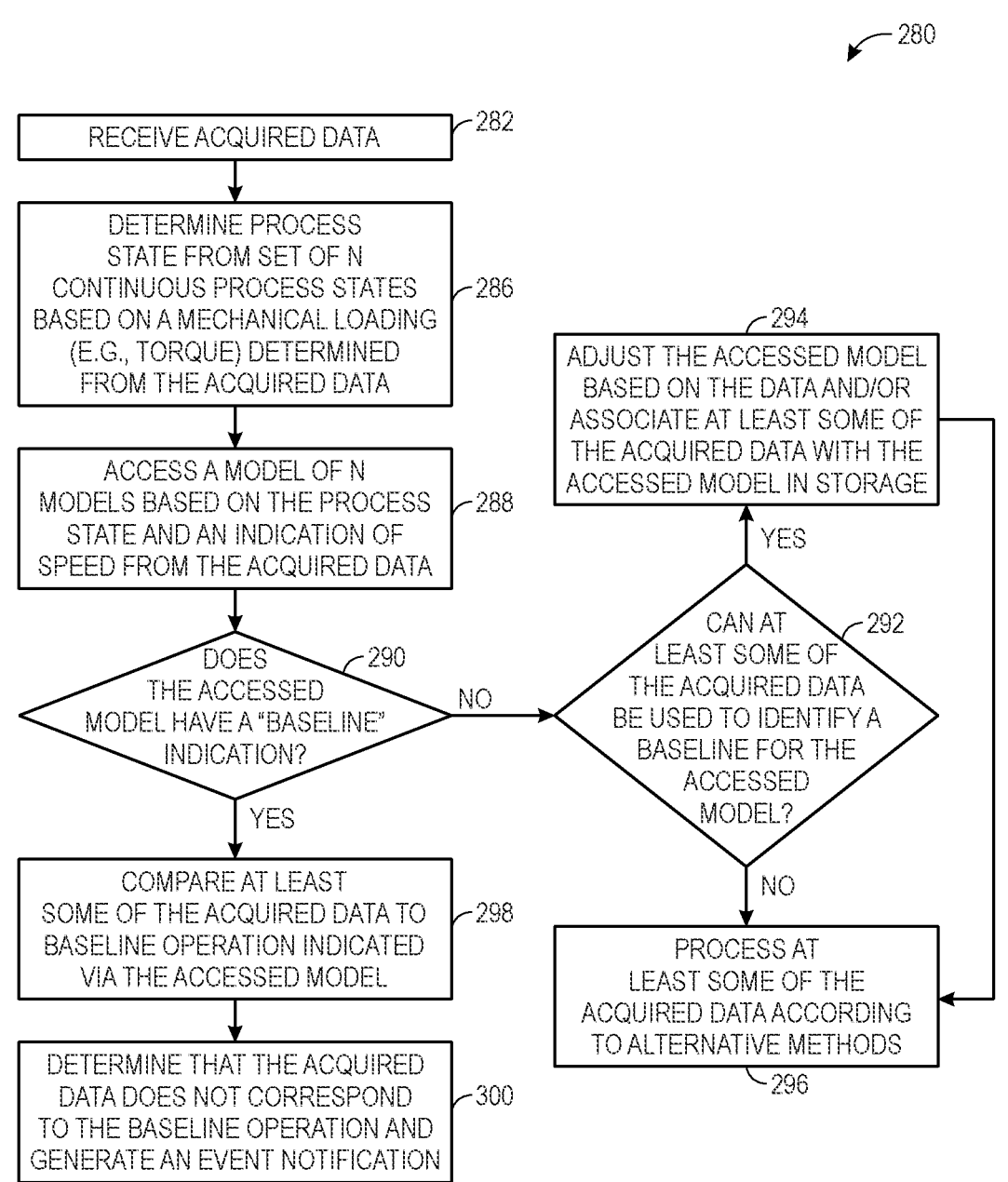
FIG. 9 is a flow chart of a method that the container-based MPC system of FIG. 5 may perform when applying the operations of FIG. 8 to a device with continuous operations between process states (e.g., pump, blower, fan), in accordance with an embodiment.

To elaborate, FIG. 9 is a flow chart of a method 280 that the container-based MPC system 140 may perform when applying the operations of FIG. 8 to an asset with continuous operations between process states (e.g., pump, blower, fan). Although the following description of the method 280 is described as being performed by the MPC system 140 via the analysis engine 146 and the notification broker 152, among other systems of FIG. 5, it should be understood that any suitable computing device and/or the industrial control system 12 may perform some or all of the operations described herein. In addition, although the method 280 is described in particular order, it should be understood that the method 280 may be performed in any suitable order.

At block 282, the MPC system 140 may receive one or more indications of acquired data 142. The acquired data 142 may include data indicative of a state 212 and operating parameter 214, such as data relating to an operating speed or frequency of the asset, an indication of mechanical loading, induced torque, line frequency, line voltages, or the like. The acquired data 142 may enable the MPC system 140 to determine which of a set of possible materials are at that time being processed by the asset, as well as determine which of a set of device models to use to evaluate whether the operation represented by the data is normal.

To elaborate, at block 286, the MPC system 140 may determine a process state from set of process states. Any number of process states may be associated with the asset and each process state may refer to one or more continuous process states, which the asset may switch between as materials handled by the asset are changed. For example, pump may be used in a process where the pump may move any one of six materials (e.g., N=6 states). The pump may operate according to different operational curves (e.g., torque-speed characteristic curves) as the different materials are moved at different speeds with different torques. The MPC system 140 may determine which region of the operational curves the pump is operating in at one time and without a process state indication from the control system. Indeed, the MPC system 140 may identified this based on the acquired data and its relationship to the operational curves. Since each of the six materials may cause the pump to operate according to a different torque-speed characteristic curve, and the MPC system 140 may identify a respective process state 212 based on which respective torque-speed characteristic curve is indicated via the acquired data 142. The different process states 212 may respectively correspond to different torque values, torque ranges, or other characteristic thresholds. The MPC system 140 may bypass specifically identifying the material when the acquired data 142 suitably indicates the process state 212 from N process states 212, which may increase a speed of identifying the process state 212 and enable monitoring to occur relatively seamlessly between materials being processed without a discrete end or transition between material processed by the asset being identified. When considering the torque-speed characteristic curves, any suitable method may be used to obtain an indication of the torque. For example, a load observer method, a torque estimator method, a Q axis current method, and/or a real power at a frequency method may be used to derive output torque.

To elaborate, the load observer method may be based on an encoder being within a motor driven by the adjustable speed drive. The encoder may provide an actual calculation of torque on a shaft of the motor, a current of the motor, and a real power of the motor, which may provide a relatively accurate indication of operation of the motor. The load observer calculation may be a percentage of load based upon flux vector feedback and encoder feedback. When paired with application speed, the encoder data may enable the MPC system 140 to determine which of the torque-speed characteristic curves that motor is operating in and thus which state 212. Furthermore, the torque estimator method may be based on using acquired data to estimate motor loading. Direct Torque estimation of output shaft torque that may be per unitized to estimate loading. The torque estimator method may be based on comparing a large sampling distribution and a relatively small sampling distribution method to evaluation statistically which torque is likely being applied. Moreover, the Q axis current method may be based on an indication of Torque output via a direct-quadrature-zero (D-Q-0) reference frame, where D may refer to a flux producing current, and Q may refer to a torque producing current. A D-Q-0 transformation may refer to an operation that enables rotating of reference frames of alternating current waveforms to derive direct current waveforms. These methods or other suitable methods may be used to estimate torque of the motor to evaluate which state 212 the motor is operated.

In some systems, other characteristic curves may be used to identify the various process states, such as an efficiency curve, a power factor curve, a current armature voltage curve, a temperature rise curve, or the like. The efficiency curve may indicate a relationship between power consumed and different load conditions. The power factor curve may indicate a relationship between a power factor and different load conditions. The current armature voltage curve indicate a relationship between an armature current and different load conditions. The temperature rise curve may indicate a relationship between a temperature of the asset and different load conditions. Any suitable relationship between acquired data and different load conditions may be used to identify which material is being processed by the asset, and thus which state 212 the asset is operating according.

At block 288, the MPC system 140 may access a device model of N device models corresponds to the state 212 and an operating parameter 214 indicated by the acquired data 142. For adjustable speed drive systems, the operating parameter 214 may be application speed, and thus may be an indication of frequency or rotations per minute (RPM) at which the drive system is operated. The N device models may be stored in storage 88 and correspond to a hierarchical index of device models corresponding to the asset illustrated in FIG. 7. The MPC system 140 may compare one or more values of the acquired data to one or more of the operating parameters 214 to identify between which or at which of the operating parameters the asset was operated at when the data was acquired. The device model may be accessed that corresponds to the combination of operating parameter 214 identified from the comparison and the identified process state.

At block 290, the MPC system 140 may determine whether the accessed device model has a "baseline" indication. When the device model is still being trained, the device model has a "training" indication. Once the device model is trained, the device model has a "baseline" indication. This is visually depicted in FIG. 13 and is described further below. The device model may be trained After the MPC system 140 receives a threshold amount of normal operation acquired data, the MPC system 140 may change the indication to "baseline" indication from "train" or "training." Training may occur by the MPC system 140 on an ongoing basis, after a suitable amount of data is ready for training, or a combination of the two approaches. After, at block 292, the MPC system 140 determines that the acquired data 142 can be used to identify a baseline operation for that state 212, the MPC system 140 may, at block 294, associate the acquired data with a device model being trained. Once associated, the accessed device model may be adjusted based on the acquired data 142, at block 294, and/or at least some of the acquired data 142 may be stored in association with the accessed device model for training at a later time once a threshold amount of data has been stored. Since the accessed device model is not in "baseline" yet, the accessed device model may not be used for anomaly analysis. Thus, the acquired data 142 may be additionally processed, at block 296, as part of control operations to further control or monitoring the asset. After block 296, the operations of the method 280 may repeat for future acquired data as respective device models of the asset are trained overtime and eventually used for monitoring operations.

Referring back to block 290, when the accessed device model corresponds to a "baseline" indication, the MPC system 140 may, at block 298, compare at least some of the acquired data to a baseline operation indicated via the accessed device model. The accessed device model having the "baseline" indication may indicate a normal operation of the asset while operated in the determined state 212 at the respective operating parameter 214. Based on the comparison of block 298, the MPC system 140 may, at block 300, determine whether or not the acquired data 142 corresponds to the baseline operation identified at block 290. When the acquired data 142 does not correspond to the baseline operation, the MPC system 140 may generate an event 152 notification via the notification broker 152, such as described above with reference to FIGS. 5-6. In some systems, operations of block 300 may include the MPC system 140 determining that the deviation between the baseline operation and the current operation indicates an alarm status associated with the asset, identifying an adjustment to remedy the alarm status, and based on the identified adjustment, transmitting one or more control signals to implement the adjustment and/or generating an instruction in the event 152 notification to instruct the industrial control system 12 to generate the one or more control signals to implement the adjustment.

The MPC system 140 may perform operations of FIGS. 8 and 9 based on configurations. The configurations may be received at least in part based on inputs to GUIs of FIGS. 11-13 and/or based on operations of FIG. 10.

To elaborate, FIG. 10 is a flow chart of a method 400 used to configure the container-based MPC system 140 with a hierarchical index for a target asset associated with the operations of FIGS. 8-9. Although the following description of the method 400 is described as being performed by the computing device 74, it should be understood that any suitable computing device may perform some or all of the operations described herein. In addition, although the method 400 is described in particular order, it should be understood that the method 400 may be performed in any suitable order.

Figure 11:
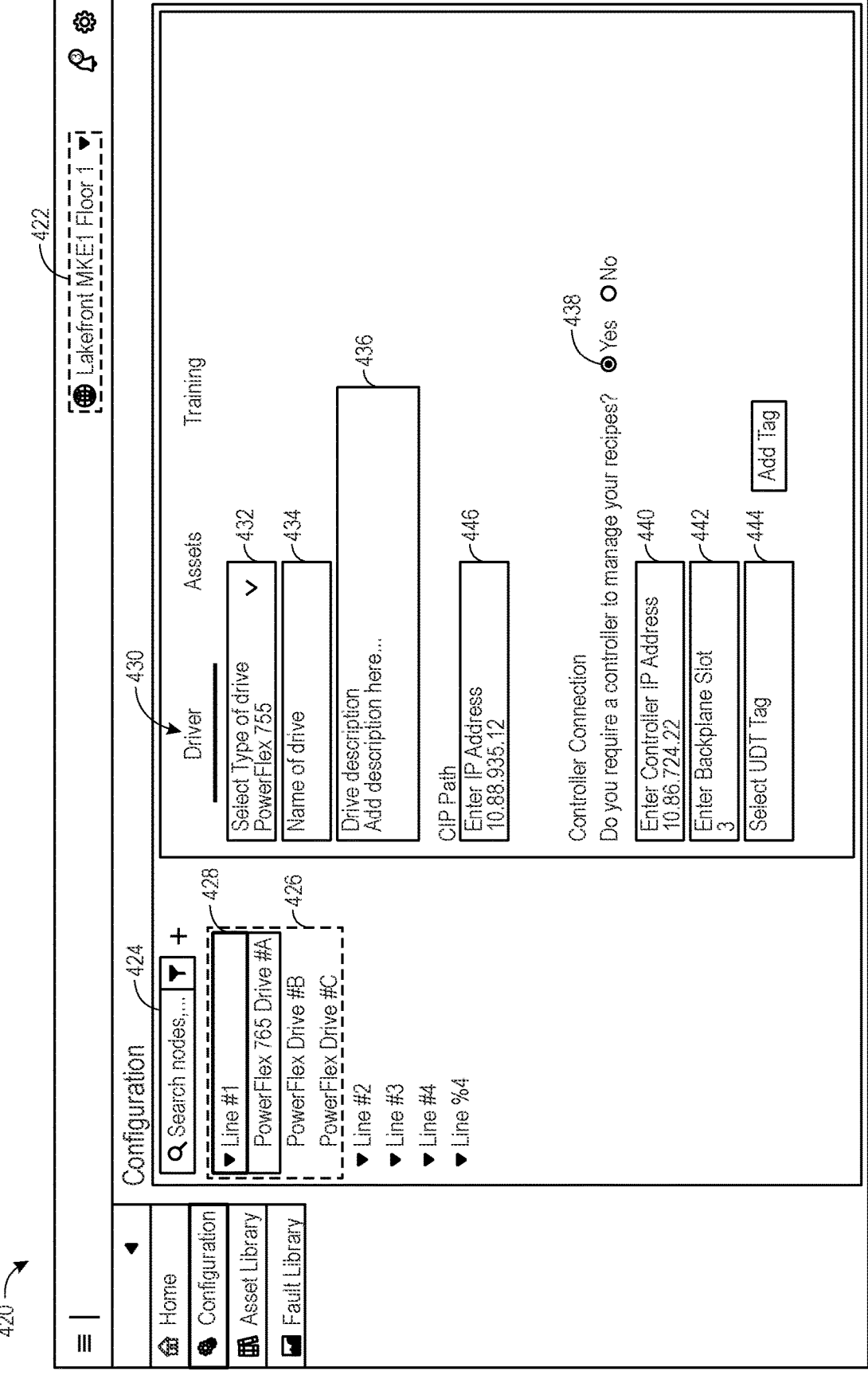
FIG. 11 is a diagrammatic representation of a first graphical user interface (GUI) associated with the configuration operations of FIG. 10, in accordance with an embodiment.
Figure 12:
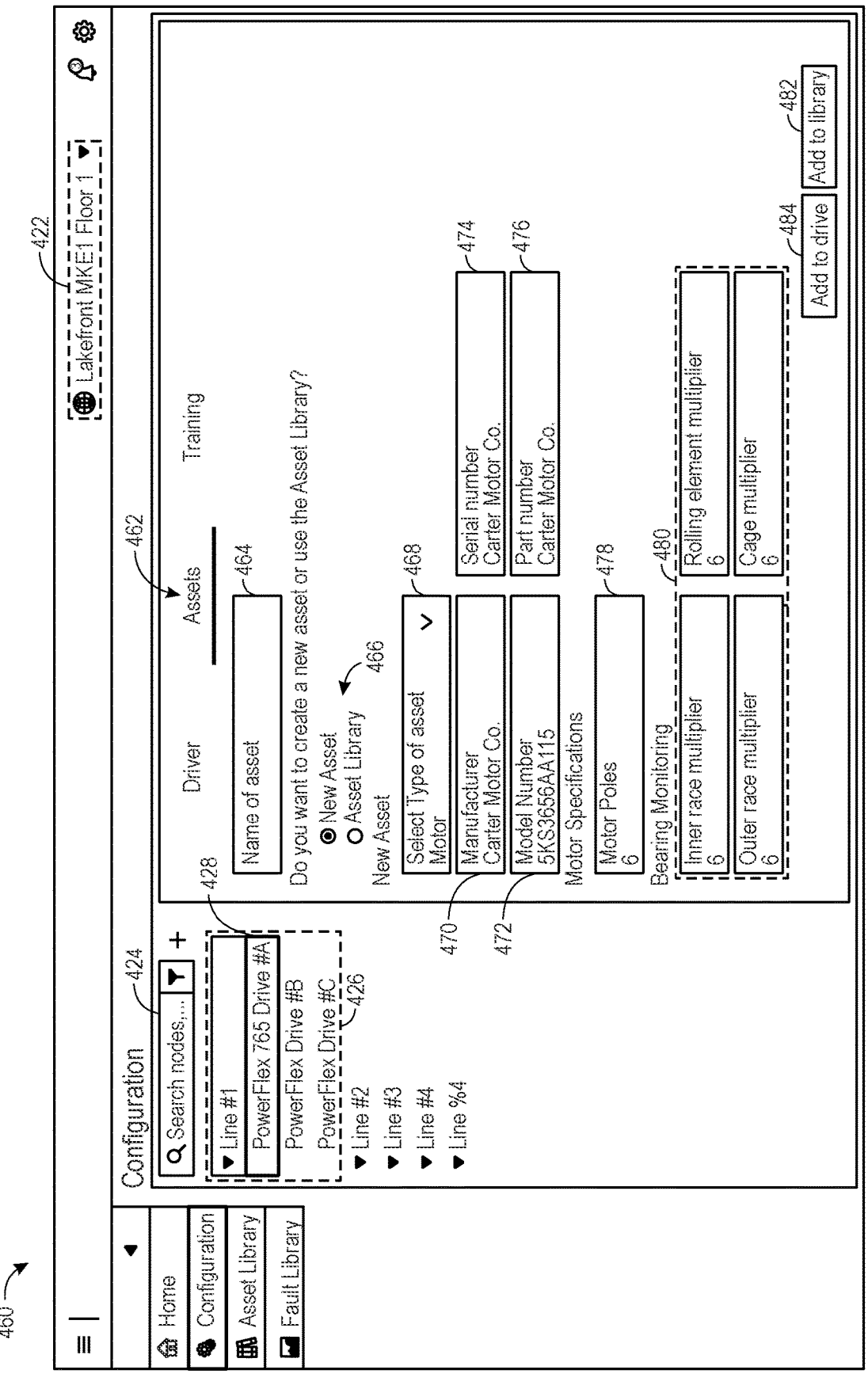
FIG. 12 is a diagrammatic representation of a first graphical user interface (GUI) associated with the configuration operations of FIG. 10, in accordance with an embodiment.
Figure 13:
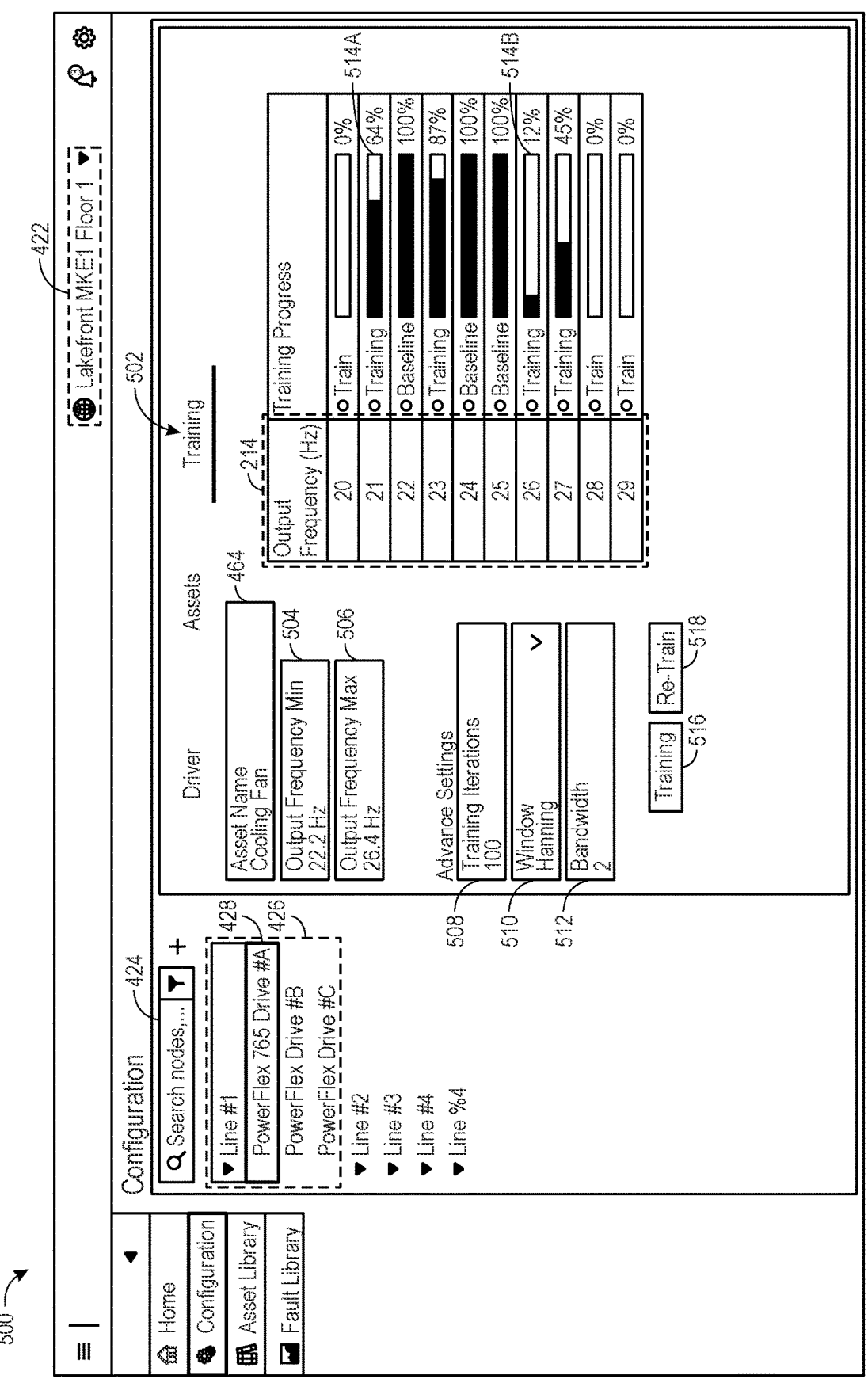
FIG. 13 is a diagrammatic representation of a first graphical user interface (GUI) associated with the configuration operations of FIG. 10, in accordance with an embodiment.

At block 402, the computing device 74 may determine an application of an asset, and at block 404, the type of the asset and the configuration of the asset. The application of the asset may correspond to a type of process that the asset is used in, a unit that the asset is physically disposed in, or the like. The type of asset may correspond to an indication of the asset being adjustable speed drive, such as a pump, blower, or drive, or other suitable asset, or the like. The configuration of the asset may correspond to a type of pump or more specific device model of the type of asset, a class or type of a component of the asset (e.g., a type of motor, motor information), or the like. The configuration of the asset may refer to a class, like a horsepower or power rating of the asset. The configuration of the asset, the type of the asset, and/or the application of the asset may be used to various process states 212 that the asset may be operated in, where N process states 212 may refer to set of possible process states 212 in which the asset is operable. The process states 212 may correspond to an indication of one or more materials capable of being loaded via the asset. The computing device 74 may determine the application of the asset based on user input, device metadata transmitted via a packet (such as at power-on or as part of an initialization operation at installation), from data stored in a database, or the like. The user input may be received via one or more of the GUIs of FIGS. 11-13. When determining the type of the asset and/or the configuration of the asset based on user input, the computing device 74 may change indications of questions presented via the GUIs based on the application of the asset from block 402 as a way to tailor the inquiry to the application of the asset. In some cases, data received as inputs to the GUIs of FIGS. 11-13 is stored in the storage 88 (or other suitable memory) to be accessed by the computing device 74 via operations of blocks 402 and/or 404.

At block 406, the computing device 74 may determine an operating range of the asset, which may be an operating speed range indicated via a frequency range (e.g., in units of Hz or other suitable frequency units), a rotations per minute (RPM) range, or the like. Indeed, the operating range may indicate a normal operating speed range of the asset, and thus is specific to the type of the asset, the application of the asset, and/or the configuration of the asset. The operating range of the asset may be indicated to the computing device 74 based on user input, device metadata transmitted via packet, data stored in database, or the like. For example, a table indicating an operating range of the asset based on a type of asset may be accessed by the computing device 74 to determine the operating range based on the type of the device. The operating range may be constant across the process states, and thus correspond to some of the operational parameters 214 indicated in FIG. 7. The operating range of the asset may correspond to a minimum operational parameter 214 and a maximum operational parameter 214. Referring to FIG. 13, the operating range of the asset may correspond to data input to field 504 and field 506, and thus may be considered an operating speed range since the data input is in units of Hz.

The operating range may be used to generate a state matrix, or one or more portions of the hierarchical index depicted in FIG. 7. The state matrix may correspond to 1-9 of FIG. 7, where the state matrices 1, 4, 7 (of process state 212A), the state matrices 2, 5, 8 (of process state 212B), and the state matrices 7, 8, 9 (of process state 212C) respectively correspond to legitimate different operating conditions within the overall system (e.g., different process states 212). Each state space of the state matrix may correspond to a combination of a process state 212 and an operating parameter 214, where the operating parameter 214 may correspond to a speed, a speed range, a parameter range, a parameter value, or the like by which to characterize a respective operation of the asset. The different process states 212 may be defined via an input to indicate the different possible materials or loads that may be handled by the asset. The states matrices 1, 2, 3 may correspond to a time at which there is no knowledge of how the application is performing (e.g., "train" indication), the state matrices 4, 5, 6 may correspond to a time at which some amount of training of the various device models is still ongoing (e.g., mixed indications of "train," "baseline," and "training"), and the state matrices 7, 8, 9 may correspond to a time a baseline operational understanding is developed in each operating parameter 214 for that state 212 for the asset (e.g., all at "baseline).

To elaborate, at block 408, the computing device 74 may generate M device models based on the device and the determined operating range from block 406. For a respective process state, different device models may be generated based on sweep from values of the determined operating range from block 406. In other words, the determined operating range of block 406 may correspond to a minimum operational parameter 214 and a maximum operational parameter 214. The computing device 74 may determine one or more values between the minimum operational parameter 214 and the maximum operational parameter 214 at which respective device models are to be created. Referring back to the example of FIG. 7, the computing device 74 may receive an indication of the operating range as between operational parameter 214A and operational parameter 214H. The computing device 74 may sweep between the values to identify operational parameters 214B-214G, where a respective of the operational parameter 214A-214H may be associated with a respective device model. Each of the N physical states may correspond to a same number of device models (e.g., 1/N*M device models). For example, an asset may correspond to 3 physical states (e.g., N=3) and 24 device models (e.g., M=24) such that each physical state corresponds to 8 device models. Each of the 8 device models may correspond to a respective value of the operating range at block 406. In some systems, the computing device 74 may expand the operating range to include a new minimum and maximum operational parameters 214. For example, the computing device 74 may increase the maximum value to be X % (e.g., 10%, any suitable percentage) greater and Y % (e.g., 10%, any suitable percentage) less than the maximum operational parameter 214 of the operating range. The sweep operation may similarly subdivide values between the minimum and maximum values to obtain one or more operational parameters 214 between the identified operating range after being expanded. For example, referring back to FIG. 7, if a provided operating range were parameters A and B and the range is expanded by 10% on each endpoint, the expanded operating range may correspond to A−1 (e.g., A−1=90%*A) and B+1 (e.g., B+1=110%*B).

At block 410, the computing device 74 may store M device models. The computing device 74 may store in storage (e.g., storage 48), suitable memory, or the like. The computing device 74 mat store respective device models of the M device models in association with a "train" indication, an operational parameter, and a respective process state of the N process states. In some cases, the N device models may be stored in association with an indication of the application of the asset, an indication of the type of asset, an indication of one or more acquired data profiles that correspond to the respective N process states (e.g., motor signature profile), or the like.

The various device models (e.g., M device models) made and associated with the asset may undergo training operations over time according to operations of FIGS. 8-9. In this way, the one or more device models may be trained for each of the N different process states until respective device models are trained on a threshold amount of acquired data. As the asset sits operating in a respective process state 212 at a respective operational parameter 214, data acquired regarding the operating of the asset may be used to train the device model corresponding to that state 212 and operational parameter 214 combination. Acquired data from an asset in a first process state 212 may not be used to train a respective device model corresponding to the asset in a second process state 212. The device models may be trained on acquired data on an ongoing basis until a threshold amount of training has occurred and/or may be trained on a dataset that includes a threshold amount of data obtained over time. Any device model outside of "baseline" indication may not be used to determine normal or anomalous operation. Once a threshold amount of data is acquired and/or training is performed for a device model, the MPC system 140 may identify a baseline normal operation for the asset when operating at that state 212 and the operating parameter 214, which may be referred to at a later time to determine whether the asset is anomalously operating.

FIGS. 11-13 depict example GUIs associated with MPC system 140 configuration operations of FIG. 10. For ease of explanation, the FIGS. 11-13 may be described together herein. FIG. 11 is a diagrammatic representation of a first GUI 420 associated with the configuration operations of FIG. 10, FIG. 12 is a diagrammatic representation of a second GUI 460 associated with the configuration operations of FIG. 10, and FIG. 13 is a diagrammatic representation of a third GUI 500 associated with the configuration operations of FIG. 10. FIGS. 11-13 may together show a configuration workflow.

The first GUI 420 may generally depict fields used to add an asset, for example a drive, to be trained and monitored via the MPC system 140. The second GUI 460 may generally depict fields used to define an application of the drive, such as whether it is operating a motor, pump, fan, or blower. Visualizations for different questions may be presented based on the data input to field 468. For example, in FIG. 12, the field 468 includes "Motor" and thus the field 478 asks for a number of poles of the motor. If the field 468 included "Fan" data, the field 478 may update to ask for an indication of "a number of blades" of the fan being added. The third GUI 500 may generally depict fields used to define training of the asset in the application, and thus may include fields 504, 506 that define an operating range of the asset.

To elaborate, the first GUI 420 may include a location indication 422, a search input 424, a line indication 426, an asset indication 428, a "drives" selection tab 430, and fields 432, 434, 436, 440, 442, 444, 446, and an "add tag" button indication, some of which may be depicted in the second GUI 460 and/or the third GUI 500 and thus descriptions are relied on herein. Field 432, field 434, and/or field 446 may correspond to an identifier of the asset. The location indication 422 may indicate a configuration being edited. For example, "the Lakefront MKE1 Floor 1" location. The location indication 422 may correspond to a unit within the industrial automation system or any suitable geolocation. The search input 424 may receive alphanumerical input data or other suitable input data and instruct a query based on the input data. For example, the computing device 74 may be instructed to search for "PowerFlex 755" in response to receiving the data via the search input 424. The line indication 426 may indicate a relationship, such as on the basis of an electrical coupling in a physical industrial automation system, between one or more assets. Here, "Drive #A," "Drive #B," "Drive #C," are visualized as related to each other via "line #1" in the industrial automation system 10. The asset indication 428 may indicate which assets of the line indication 426 are related. Here, the asset indication 428 also corresponds to a selected asset of the assets. One or more of the fields of the first GUI 420 may correspond to the selected asset indication 428.

The field 432 may enable a type of device of the selected asset indication 428 to be defined. The field 434 may enable the selected asset indication 428 to be named. The name in the field 434 may change what the selected asset indication 428 is represented as in the line indication 426 portion of the GUIs 420, 460, and 500. The field 436 may enable a description to be input. The description input into the field 436 may be associated with the selected asset indication 428. The field 446 may enable association of a CIP path indication with the selected asset indication 428. The CIP path indication may link a record of the selected asset indication 428 with one or more data sources that transmit data in association with an IP address corresponding to the CIP path.

Radio button indication 438 may receive an input indicative of whether the selected asset indication 428 corresponds to a control system managing the device models. The control system, when "yes" is selected, may be identified via IP address input to field 440. The fields 442 and 444 may receive indications of a backplane slot and/or a selected UDT tag, which may link a data source associated with the selected asset indication 428 to the identified control system of field 440.

The second GUI 460 of FIG. 12 depicts adding a new asset to an asset library while tab 462 is selected (e.g., via radio button 466). A name field 464 may receive a name for the new asset, which may be an identifier of the asset that identifies the asset relative to other industrial automation devices and/or assets within the industrial automation system 10. One or more portions of data depicted via FIGS. 11-13 may be associated by the MPC system 140 in memory based on an indication of the identifier of the asset entered in field 464. The fields 468, 470, 472, 474, and 476 receive different information corresponding to the new asset, such as a type of asset, a manufacturer of the asset, a device model number, a serial number, and/or a part number. In field, 468, the type of the asset may be referenced in FIG. 10 at block 404. The field 468 may include indications of types of assets, such as motor, fan, blowers, pumps, or the like. An input received via field 468 may change visualizations of questions presented, such as cause alternations of questions via fields 478 and 480, via At field 478, an input may be received that corresponds to a number of motor poles of the asset, when the asset is a motor. Fields 480 may correspond to various bearing monitoring parameters that may be used when monitoring a motor. The bearing monitoring parameters may include an inner race multiplier, a cage multiplier, a rolling multiplier, among others. Button indication 484 may save the data to new asset entry and button indication 482 may store the data to an asset library for future reference and/or adoption as another asset.

The third GUI 500 depicts a training configuration GUI corresponding to the asset while the training tab 502 is selected. In this example, the asset referenced by the depicted the third GUI 500 may correspond to 1 process state 212 and include multiple (e.g., 10) respective operational parameters 214. Thus, the asset may correspond to 10 respective device models. The fields 504 and 506 may be used to define an operating range, such as that referenced at block 406 of FIG. 10, and thus may be considered an indication of an operating speed range. The operating range may be expanded by X %, such as by 10% in this example. X may equal any suitable value (e.g., 2, 3, 6, 10, 20). The field 508 may receive an input defining a number of training iterations to perform on a respective device model while in the "training" state before entering the "baseline" state. The field 508 may correspond to a threshold number of data points to be acquired at a respective operational parameter 214 (e.g., frequency) before a respective device model is to be considered trained. The field 510 may receive an indication of a window configuration, which may define how the acquired data 142 is to be processed. Indeed, the fields 510 and 512 may receive inputs defining a type and characteristic of data processing to use and/or a type of computational window to be applied, here "Hanning" having a bandwidth of "2" may be used for signal processing, and other methods may be used. Some information associated with the GUIs 420, 460, and 500 may be used during device model training when an input to button 516 is received (e.g., "Train") and/or may be used to re-train a device model when an input to button 518 is received (e.g., "Re-Train").

Based on the metrics of fields 508, 510, and 512, respective progress bars may be generated to illustrate via a visualization a percentage of completion of training of a respective device model. As training or re-training occurs of the respective device models (here for parameters 20 Hz through 29 Hz), progress bar graphics may be updated by the MPC system 140. The device model corresponding to progress bar 514A may be relatively more trained than the device model corresponding to progress bar 514B. When the threshold amount of training iterations is 100, the progress bar 514A corresponds to a device model that has been trained 64 times and the progress bar 514B corresponds to a device model that has been trained 12 times. As training operations occur, an indication of a number of iterations performed may be updated by the MPC system 140 and may be presented via the third GUI 500 to communicate a training status.

The MPC system 140 may train the device model a threshold number of training iterations before the device model corresponds to a "baseline" indication. The threshold number of training iterations may be defined via the field 508 and/or determined through another suitable method. The MPC system 140 may increment a training count indication of the device model after each training of that device model. The threshold number of training iterations and the training count indication may be compared to determine whether the device model has undergone a threshold number of training operations.

Device models described herein may correspond to an asset, drive associated with controlling the asset, or the like. Indeed, the asset may move material physically during normal operation based on operations controlled by a drive, such as a variable speed drive. The operations of the asset and of the drive may vary based on the material physically moved by the asset, and thus either one and/or both may be device modelled using systems and methods described herein.

Systems and methods described herein may use containers and/or may implement improved machine learning operations capable of being applied to continuous process state device operation without use of a process state identification data from a control system. As described herein, training time to identify a baseline operation of the asset may reduce since respective process states are individually trained, which may lead to the overall training process being less disruptive to the process, being relatively more accurate in its prediction ability, among other improvements. The systems and methods described herein may use acquired data to identify a process state of the asset based on the actual operation of the asset, as opposed to process state identification data from a control system. For example, sensed data associated with operations of the asset may be used to identify a process state from multiple process states, which may be used to determine which device model of multiple device models may be referenced for a specific operational parameter. Indeed, with the identified process state, the systems and methods also may switch between device models and training or baseline operational modes based on the identified process state and an operational parameter. Training and classification operations may similarly access a same hierarchical index for the asset, enabling a more readily implemented machine learning program that enables the more frequent types of loads and operations to be trained faster in situ without having to disrupt the process to obtain the baseline. Furthermore, by deploying one or more of the systems and methods in association with programs operated within containers, the industrial automation system may better manage computing resources. Indeed, by deploying non-perpetual containers that terminate based on time or data acquisition parameters, computing resources may be deployed more efficiently in the industrial automation system as computing resources may not be tied up in otherwise inactive or unused data acquisition operations. Other benefits are described and/or suggested herein. Accordingly, use of the disclosed techniques may improve product quality, process quality, and efficiency within the industrial automation system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
an industrial automation device configured to acquire data associated with an operation of an asset, wherein the asset is configured to operate in different process states of a plurality of process states while handling respective physical materials of a plurality of physical materials, wherein the asset corresponds to a plurality of device models, and wherein each device model of the plurality of device models corresponds to a respective process state of the plurality of process states, a respective speed range of an operating speed range, and a respective training status indication;
processing circuitry communicatively coupled to the industrial automation device, wherein the processing circuitry is configured to:
receive the acquired data from the industrial automation device representing a current operation of the asset;
determine a process state from the plurality of process states corresponding to the current operation of the asset based on the acquired data;
identify a device model of the plurality of device models based on the process state and the acquired data, wherein the device model corresponds to a speed range of the operating speed range and a training status indication;
determine that the device model is trained based on the training status indication, wherein the device model corresponds to an indication of a baseline operation of the asset while trained;
compare at least some of the acquired data to the baseline operation to determine a deviation between an expected operation and the current operation; and
generate, based on the deviation, one or more control signals to implement an adjustment to the industrial automation device.

2. The system of claim 1, wherein the processing circuitry is configured to generate an event notification based on the deviation between the expected operation and the current operation crossing a threshold.

3. The system of claim 1, wherein the baseline operation corresponds to a set of data generated based on training operations performed while the asset is operated in situ within an industrial automation system and without operating the asset into a training mode.

4. The system of claim 3, wherein the processing circuitry is configured to:
train the device model over a threshold number of iterations; and
replace a "training" indication with a "baseline" indication, wherein, after the threshold number of iterations have occurred, the training status indication comprises the "baseline" indication configured to indicate that the device model comprises the indication of the baseline operation.

5. The system of claim 1, wherein the plurality of process states corresponds to a continuous process, and wherein the processing circuitry is configured to determine the process state without an indication of the process state from an industrial control system.

6. The system of claim 1, wherein the processing circuitry is configured to:
receive an indication of an identifier of the asset;
receive an indication of the operating speed range of the asset;
receive an indication of a type of the asset;
generate the plurality of device models based on the operating speed range and the type of the asset; and
associate the plurality of device models with the identifier of the asset in memory, wherein each device model of the plurality of device models corresponds to a respective status indication of a plurality of status indications indicating that each of the plurality of device models are untrained.

7. The system of claim 6, wherein the processing circuitry is configured to:

at a first time, receive additional acquired data corresponding to the process state and the speed range;

train the device model based on the additional acquired data and incrementing a training count indication;

determine that the device model has been trained on a threshold number of iterations based on the training count indication and change the training status indication of the device model to correspond to the indication of the baseline operation; and receive the acquired data at a second time after the first time and access the device model comprising the indication of the baseline operation of the asset.

8. The system of claim 1, wherein a first subset of device models of the plurality of device models are untrained, wherein a second subset of device models of the plurality of device models are being trained, wherein a third subset of device models of the plurality of device models are trained, and wherein the device model corresponds to the third subset of device models.

9. The system of claim 1, wherein the processing circuitry corresponds to a container-based model predictive control (MPC) system.

10. The system of claim 1, wherein the processing circuitry corresponds to an analysis engine.

11. A non-transitory, tangible, computer-readable medium storing instructions that, when executed by processing circuitry, cause the processing circuitry to perform operations comprising:

receiving an indication of an industrial automation device, wherein the industrial automation device corresponds to an asset that is targeted for operational baseline device modeling;

determining an application of the industrial automation device;

determining a configuration of the asset based on the application;

determining an operating range of the asset;

generating a plurality of device models corresponding to the asset based on the operating range, the application, and the configuration;

storing the plurality of device models in memory in association with a plurality of indications of a plurality of process states, a plurality of operational parameters associated with the operating range, and a plurality of training status indications, wherein the industrial automation device is configured to operate in different process states of the plurality of process states;

receiving acquired data from the industrial automation device, wherein the acquired data indicates a current operation of the asset;

identifying a device model of the plurality of device models based on the acquired data, wherein the device model corresponds to a process state of the plurality of process states, an operational parameter of the plurality of operational parameters, and a training status indication of the plurality of training status indications;

determining that the training status indication indicates that training of the device model has yet to be completed; and training the device model based on at least some of the acquired data based on that the training of the device model has yet to be completed.

12. The non-transitory, tangible, computer-readable medium of claim 11, wherein the instructions cause the processing circuitry to perform operations comprising receiving an indication of the plurality of process states.

13. The non-transitory, tangible, computer-readable medium of claim 12, wherein the instructions cause the processing circuitry to perform operations comprising generating the plurality of device models based on the operating range, the application, and the configuration at least in part by:

identifying a plurality of speed ranges within the operating range; and generating, for each of the plurality of process states, a plurality of device models corresponding to each respective speed range of the plurality of speed ranges.

14. The non-transitory, tangible, computer-readable medium of claim 11, wherein the instructions cause the processing circuitry to perform operations comprising:

receiving acquired data from the industrial automation device, wherein the acquired data represents a current operation of the industrial automation device through a torque value and a speed value;

determining a process state of the plurality of process states based on the torque value;

identifying a device model of the plurality of device models based on the process state and the speed value;

determining that the device model comprises the training status indication of a baseline operation of the industrial automation device corresponding to the speed value and the process state; and comparing at least some of the acquired data to the baseline operation to determine a deviation between the baseline operation and the current operation.

15. The non-transitory, tangible, computer-readable medium of claim 11, wherein the instructions cause the processing circuitry to perform operations comprising:

receiving acquired data from the industrial automation device, wherein the acquired data represents a current operation of the industrial automation device through a torque value and a speed value;

determining a process state of the plurality of process states based on the torque value;

identifying a device model of the plurality of device models based on the process state and the speed value;

determining that the device model comprises the training status indication of an ongoing training operation; and training the device model based on at least some of the acquired data based on determining that the device model comprises the training status indication of the ongoing training operation.

16. A non-transitory, tangible, computer-readable medium storing instructions that, when executed by processing circuitry, cause the processing circuitry to perform operations comprising:

receiving acquired data from an industrial automation device, wherein the acquired data indicates a current operation of an asset, wherein the asset is configured to operate in different process states of a plurality of process states while handling respective physical materials of a plurality of physical materials;

accessing a plurality of device models associated with a plurality of indications of the plurality of process states, a plurality of indications of a plurality of speeds, and a plurality of training status indications, wherein each device model of the plurality of device models corresponds to a respective process state of the plurality of process states, a respective speed of the plurality of speeds, and a respective training status indication of the plurality of training status indications;

determining a process state of the plurality of process states based on the acquired data;

identifying a device model of the plurality of device models based on the process state and the acquired data, wherein the device model corresponds to a speed range of the plurality of speeds and a training status indication of the plurality of training status indications;

determining that the device model is trained based on the training status indication, wherein the device model corresponds to an indication of a baseline operation while trained;

comparing at least some of the acquired data to the baseline operation to determine a deviation between the baseline operation and the current operation; and generating, based on the deviation, one or more control signals to implement an adjustment to the industrial automation device.

17. The non-transitory, tangible, computer-readable medium of claim 16, wherein the instructions cause the processing circuitry to perform operations comprising receiving the acquired data from the industrial automation device based on a common industrial protocol (CIP) path, an IP address, a device identifier, or any combination thereof.

18. The non-transitory, tangible, computer-readable medium of claim 16, wherein the asset is different from the processing circuitry.

19. The non-transitory, tangible, computer-readable medium of claim 16, wherein the instructions cause the processing circuitry to perform operations comprising:

receiving an indication of an identifier of the asset;

receiving an indication of an operating speed range;

receiving an indication of a type of the asset;

generating the plurality of device models based on the operating speed range and the type of the asset; and associating the plurality of device models with the identifier of the asset in memory.

20. The non-transitory, tangible, computer-readable medium of claim 16, wherein the instructions cause the processing circuitry to perform operations comprising:

determining that the deviation between the baseline operation and the current operation indicates an alarm status associated with the asset;

identifying an adjustment to remedy the alarm status; and transmitting one or more control signals to implement the adjustment.

\* \* \* \* \*